US011838083B2

(12) United States Patent
Huang et al.

(10) Patent No.: US 11,838,083 B2
(45) Date of Patent: Dec. 5, 2023

(54) SEQUENCE BASED UPLINK CONTROL CHANNEL COEXISTENCE

(71) Applicant: QUALCOMM Incorporated, San Diego, CA (US)

(72) Inventors: Yi Huang, San Diego, CA (US); Peter Gaal, San Diego, CA (US); Wei Yang, San Diego, CA (US); Tingfang Ji, San Diego, CA (US); Hwan Joon Kwon, San Diego, CA (US); Krishna Kiran Mukkavilli, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 17/356,232

(22) Filed: Jun. 23, 2021

(65) Prior Publication Data

US 2022/0021434 A1    Jan. 20, 2022

Related U.S. Application Data

(60) Provisional application No. 63/052,046, filed on Jul. 15, 2020.

(51) Int. Cl.
*H04B 7/06* (2006.01)
*H04L 27/26* (2006.01)
(Continued)

(52) U.S. Cl.
CPC ......... *H04B 7/0639* (2013.01); *H04B 7/0456* (2013.01); *H04L 27/2607* (2013.01); *H04W 72/1268* (2013.01)

(58) Field of Classification Search
None
See application file for complete search history.

(56) References Cited

U.S. PATENT DOCUMENTS

| 9,635,664 B2 | 4/2017 | Papathanassiou et al. |
| 2014/0098780 A1* | 4/2014 | Kim ................ H04W 72/0446 370/329 |

(Continued)

FOREIGN PATENT DOCUMENTS

| EP | 2894797 B1 | 1/2020 |
| WO | WO-2018129081 A1 | 7/2018 |

(Continued)

OTHER PUBLICATIONS

International Search Report and Written Opinion—PCT/US2021/038885—ISA/EPO—dated Oct. 18, 2021 (206276WO).

*Primary Examiner* — Rebecca E Song
(74) *Attorney, Agent, or Firm* — QUALCOMM Incorporated

(57) ABSTRACT

Methods, systems, and devices for wireless communications are described. A user equipment (UE) may receive a configuration signal indicating a codebook construction configuration for constructing a codebook of sequences for conveying a first type of uplink payload in a resource block that is orthogonal to a second type of uplink payload transmitted from a second UE in the resource block. The UE may construct the codebook of sequences for the first type of uplink payload according to the codebook construction configuration. The UE may generate the first type of uplink payload for transmission using a first sequence from the codebook of sequences. The UE may transmit the first type of uplink payload in the resource block, wherein the first type of uplink payload is multiplexed in the resource block with the second type of uplink payload from the second UE.

27 Claims, 18 Drawing Sheets

(51) Int. Cl.
*H04W 72/1268* (2023.01)
*H04B 7/0456* (2017.01)

(56) References Cited

U.S. PATENT DOCUMENTS

2020/0106566 A1\* 4/2020 Yeo .................. H04W 28/04
2021/0152211 A1\* 5/2021 Matsumura ........... H04L 5/0091
2022/0116968 A1\* 4/2022 Choi .................. H04L 5/0053

FOREIGN PATENT DOCUMENTS

WO    WO-2020067801 A1 \* 4/2020 ........... H04L 5/0007
WO    WO-2021154020 A1 \* 8/2021

\* cited by examiner

SEQUENCE BASED UPLINK CONTROL CHANNEL COEXISTENCE

CROSS REFERENCE

The present Application for Patent claims the benefit of U.S. Provisional Patent Application No. 63/052,046 by HUANG et al., entitled "SEQUENCE BASED UPLINK CONTROL CHANNEL COEXISTENCE," filed Jul. 15, 2020, assigned to the assignee hereof, and expressly incorporated by reference herein.

FIELD OF TECHNOLOGY

The following relates to wireless communications, including sequence based uplink control channel coexistence.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sequence based uplink control channel coexistence. Generally, the described techniques provide for coexistence for different types of uplink data (e.g., a payload of uplink data) transmissions by disparate user equipment (UE). That is, a first UE may be a modern or advanced UE performing uplink transmissions using corresponding advanced techniques, whereas a second UE may be a legacy UE performing uplink transmissions using legacy techniques. This may result in different types of uplink payload being communicated by the first UE and the second UE. Aspects of the described techniques provide mechanisms where the first and second UE can communicate first and second types of uplink payload, respectively, to a base station in a resource block by multiplexing the different types of uplink payload. In some aspects, this may include the base station transmitting or otherwise conveying a configuration signal to the first UE indicating a codebook construction configuration.

Broadly, the first UE may utilize the codebook construction configuration to construct a codebook of sequences for conveying the first type of uplink payload in the resource block. The first UE may communicate the first type of uplink payload in the resource block that is orthogonal to (e.g., multiplexed with) the second type of uplink payload being transmitted by the second UE in the resource block. This may include the first UE constructing a codebook of sequences for the first type of uplink payload according to the codebook construction configuration and then generating the first type of uplink payload for transmission using a first sequence from the codebook of sequences. The first UE may transmit the first type of uplink payload in the resource block, with the first type of uplink payload being multiplexed in the resource block with the second type of uplink payload being transmitted by the second UE. The base station may receive the first type of uplink payload in the resource block from the first UE and the second type of uplink payload in the resource block from the second UE. The base station may demultiplex the first type of uplink payload from the second type of uplink payload and then construct the codebook of sequences for the first type of uplink payload according to the codebook construction configuration provided to the first UE. The base station may decode the first type of uplink payload using the codebook of sequences.

A method of wireless communication at a first UE is described. The method may include receiving a configuration signal indicating a codebook construction configuration for constructing a codebook of sequences for conveying a first type of uplink payload in a resource block that is orthogonal to a second type of uplink payload transmitted from a second UE in the resource block, constructing the codebook of sequences for the first type of uplink payload according to the codebook construction configuration, generating the first type of uplink payload for transmission using a first sequence from the codebook of sequences, and transmitting the first type of uplink payload in the resource block, where the first type of uplink payload is multiplexed in the resource block with the second type of uplink payload from the second UE.

An apparatus for wireless communication at a first UE is described. The apparatus may include a processor, memory coupled with the processor, and instructions stored in the memory. The instructions may be executable by the processor to cause the apparatus to receive a configuration signal indicating a codebook construction configuration for constructing a codebook of sequences for conveying a first type of uplink payload in a resource block that is orthogonal to a second type of uplink payload transmitted from a second UE in the resource block, construct the codebook of sequences for the first type of uplink payload according to the codebook construction configuration, generate the first type of uplink payload for transmission using a first sequence from the codebook of sequences, and transmit the first type of uplink payload in the resource block, where the first type of uplink payload is multiplexed in the resource block with the second type of uplink payload from the second UE.

Another apparatus for wireless communication at a first UE is described. The apparatus may include means for receiving a configuration signal indicating a codebook construction configuration for constructing a codebook of sequences for conveying a first type of uplink payload in a resource block that is orthogonal to a second type of uplink payload transmitted from a second UE in the resource block, constructing the codebook of sequences for the first type of uplink payload according to the codebook construction configuration, generating the first type of uplink payload for transmission using a first sequence from the codebook of sequences, and transmitting the first type of uplink payload in the resource block, where the first type of uplink payload is multiplexed in the resource block with the second type of uplink payload from the second UE.

A non-transitory computer-readable medium storing code for wireless communication at a first UE is described. The code may include instructions executable by a processor to receive a configuration signal indicating a codebook construction configuration for constructing a codebook of sequences for conveying a first type of uplink payload in a resource block that is orthogonal to a second type of uplink payload transmitted from a second UE in the resource block, construct the codebook of sequences for the first type of uplink payload according to the codebook construction configuration, generate the first type of uplink payload for transmission using a first sequence from the codebook of sequences, and transmit the first type of uplink payload in the resource block, where the first type of uplink payload is multiplexed in the resource block with the second type of uplink payload from the second UE.

In some examples of the method, apparatuses, and non-transitory computer-readable medium described herein, receiving the configuration signal may include operations, features, means, or instructions for receiving the configuration signal indicating the codebook construction configuration that indicates a set of cyclic shift indices, a set of discrete Fourier transform (DFT) indices, or a combination, to use for constructing the codebook of sequences.

In some examples of the method, apparatuses, and non-transitory computer-readable medium described herein, receiving the configuration signal may include operations, features, means, or instructions for receiving the configuration signal indicating the codebook construction configuration that indicates a set of cyclic shift indices, a set of DFT indices, or a combination thereof, to avoid when constructing the codebook of sequences.

In some examples of the method, apparatuses, and non-transitory computer-readable medium described herein, receiving the configuration signal may include operations, features, means, or instructions for receiving the configuration signal indicating the codebook construction configuration that indicates a starting index and quantity of indices for a set of cyclic shift indices, a set of DFT indices, or a combination thereof, to use for constructing the codebook of sequences.

Some examples of the method, apparatuses, and non-transitory computer-readable medium described herein may further include operations, features, means, or instructions for determining that at least one cyclic shift index of the set of cyclic shift indices, at least one DFT index of the set of DFT indices, or a combination thereof, used to construct the codebook of sequences may be to be avoided, and replacing the at least one cyclic shift index, the at least one DFT index, or combination thereof, with a virtual cyclic shift index, a virtual DFT index, or combination thereof, in the codebook of sequences.

Some examples of the method, apparatuses, and non-transitory computer-readable medium described herein may further include operations, features, means, or instructions for generating a virtual set of cyclic shift indices, a virtual set of DFT indices, or a combination thereof, constructing the codebook of sequences based on the virtual set of cyclic shift indices, the virtual set of DFT indices, or the combination thereof, and mapping, based on the configuration signal, the virtual set of cyclic shift indices, the virtual set of DFT indices, or combination thereof, to a real set of cyclic shift indices, a real set of DFT indices, or combinations thereof.

In some examples of the method, apparatuses, and non-transitory computer-readable medium described herein, constructing the codebook of sequences according to the codebook construction configuration may include operations, features, means, or instructions for generating an orthogonal sequence pool by mapping resource elements associated with the orthogonal sequence pool in the physical domain to resource elements in a virtual domain, constructing a virtual codebook of sequences according to the mapping, converting uplink payload data into an integer corresponding to a first sequence from the virtual codebook of sequences, mapping the first sequence to a set of virtual resource elements in the virtual domain, and mapping the set of virtual resource elements in the virtual domain to a set of physical resource elements of the resource block in a physical domain for transmitting the first type of uplink payload in the resource block.

In some examples of the method, apparatuses, and non-transitory computer-readable medium described herein, receiving the configuration signal may include operations, features, means, or instructions for receiving the configuration signal that includes at least one of a radio resource control (RRC) signal, a medium access control (MAC) control element (CE), a downlink control information (DCI), or a combination thereof.

In some examples of the method, apparatuses, and non-transitory computer-readable medium described herein, the first type of uplink payload includes a physical uplink control channel (PUCCH) payload and the second type of uplink payload includes a legacy PUCCH payload.

A method of wireless communication at a base station is described. The method may include transmitting, to a first UE, a configuration signal indicating a codebook construction configuration for the first UE to use for constructing a codebook of sequences for conveying a first type of uplink payload in a resource block that is orthogonal to a second type of uplink payload transmitted from a second UE, receiving, the first type of uplink payload in the resource block from the first UE and the second type of uplink payload in the resource block from the second UE, demultiplexing the first type of uplink payload from the second type of uplink payload, constructing the codebook of sequences for the first type of uplink payload according to the codebook construction configuration, and decoding the first type of uplink payload based on the codebook of sequences.

An apparatus for wireless communication at a base station is described. The apparatus may include a processor, memory coupled with the processor, and instructions stored in the memory. The instructions may be executable by the processor to cause the apparatus to transmit, to a first UE, a configuration signal indicating a codebook construction configuration for the first UE to use for constructing a codebook of sequences for conveying a first type of uplink payload in a resource block that is orthogonal to a second type of uplink payload transmitted from a second UE, receive, the first type of uplink payload in the resource block from the first UE and the second type of uplink payload in the resource block from the second UE, demultiplex the first type of uplink payload from the second type of uplink payload, construct the codebook of sequences for the first type of uplink payload according to the codebook construction configuration, and decode the first type of uplink payload based on the codebook of sequences.

Another apparatus for wireless communication at a base station is described. The apparatus may include means for transmitting, to a first UE, a configuration signal indicating a codebook construction configuration for the first UE to use for constructing a codebook of sequences for conveying a first type of uplink payload in a resource block that is orthogonal to a second type of uplink payload transmitted from a second UE, receiving, the first type of uplink payload in the resource block from the first UE and the second type of uplink payload in the resource block from the second UE, demultiplexing the first type of uplink payload from the second type of uplink payload, constructing the codebook of sequences for the first type of uplink payload according to the codebook construction configuration, and decoding the first type of uplink payload based on the codebook of sequences.

A non-transitory computer-readable medium storing code for wireless communication at a base station is described. The code may include instructions executable by a processor to transmit, to a first UE, a configuration signal indicating a codebook construction configuration for the first UE to use for constructing a codebook of sequences for conveying a first type of uplink payload in a resource block that is orthogonal to a second type of uplink payload transmitted from a second UE, receive, the first type of uplink payload in the resource block from the first UE and the second type of uplink payload in the resource block from the second UE, demultiplex the first type of uplink payload from the second type of uplink payload, construct the codebook of sequences for the first type of uplink payload according to the codebook construction configuration, and decode the first type of uplink payload based on the codebook of sequences.

In some examples of the method, apparatuses, and non-transitory computer-readable medium described herein, transmitting the configuration signal may include operations, features, means, or instructions for transmitting the configuration signal indicating the codebook construction configuration that indicates a set of cyclic shift indices, a set of DFT indices, or a combination, to use for constructing the codebook of sequences.

In some examples of the method, apparatuses, and non-transitory computer-readable medium described herein, transmitting the configuration signal may include operations, features, means, or instructions for transmitting the configuration signal indicating the codebook construction configuration that indicates a set of cyclic shift indices, a set of DFT indices, or a combination thereof, to avoid when constructing the codebook of sequences.

In some examples of the method, apparatuses, and non-transitory computer-readable medium described herein, transmitting the configuration signal may include operations, features, means, or instructions for transmitting the configuration signal indicating the codebook construction configuration that indicates a starting index and quantity of indices for a set of cyclic shift indices, a set of DFT indices, or a combination thereof, to use for constructing the codebook of sequences.

Some examples of the method, apparatuses, and non-transitory computer-readable medium described herein may further include operations, features, means, or instructions for determining that at least one cyclic shift index of the set of cyclic shift indices, at least one DFT index of the set of DFT indices, or a combination thereof, used to construct the codebook of sequences may be to be avoided, and replacing the at least one cyclic shift index, the at least one DFT index, or combination thereof, with a virtual cyclic shift index, a virtual DFT index, or combination thereof, in the codebook of sequences.

In some examples of the method, apparatuses, and non-transitory computer-readable medium described herein, constructing the codebook of sequences may include operations, features, means, or instructions for generating a virtual set of cyclic shift indices, a virtual set of DFT indices, or a combination thereof, constructing the codebook of sequences based on the virtual set of cyclic shift indices, the virtual set of DFT indices, or the combination thereof, and mapping, based on the configuration signal, the virtual set of cyclic shift indices, the virtual set of DFT indices, or combination thereof, to a real set of cyclic shift indices, a real set of DFT indices, or combinations thereof.

In some examples of the method, apparatuses, and non-transitory computer-readable medium described herein, constructing the codebook of sequences according to the codebook construction configuration may include operations, features, means, or instructions for generating an orthogonal sequence pool by mapping resource elements associated with the orthogonal sequence pool in the physical domain to resource elements in a virtual domain, constructing a virtual codebook of sequences according to the mapping, converting uplink payload data into an integer corresponding to a first sequence from the virtual codebook of sequences, mapping the first sequence to a set of virtual resource elements in the virtual domain, and mapping the set of virtual resource elements in the virtual domain to a set of physical resource elements of the resource block in a physical domain for transmitting the first type of uplink payload in the resource block.

In some examples of the method, apparatuses, and non-transitory computer-readable medium described herein, transmitting the configuration signal may include operations, features, means, or instructions for transmitting the configuration signal that includes at least one of a RRC signal, a MAC CE, a DCI, or a combination thereof.

In some examples of the method, apparatuses, and non-transitory computer-readable medium described herein, the first type of uplink payload includes a PUCCH payload and the second type of uplink payload includes a legacy PUCCH payload.

DETAILED DESCRIPTION

Figure 1:
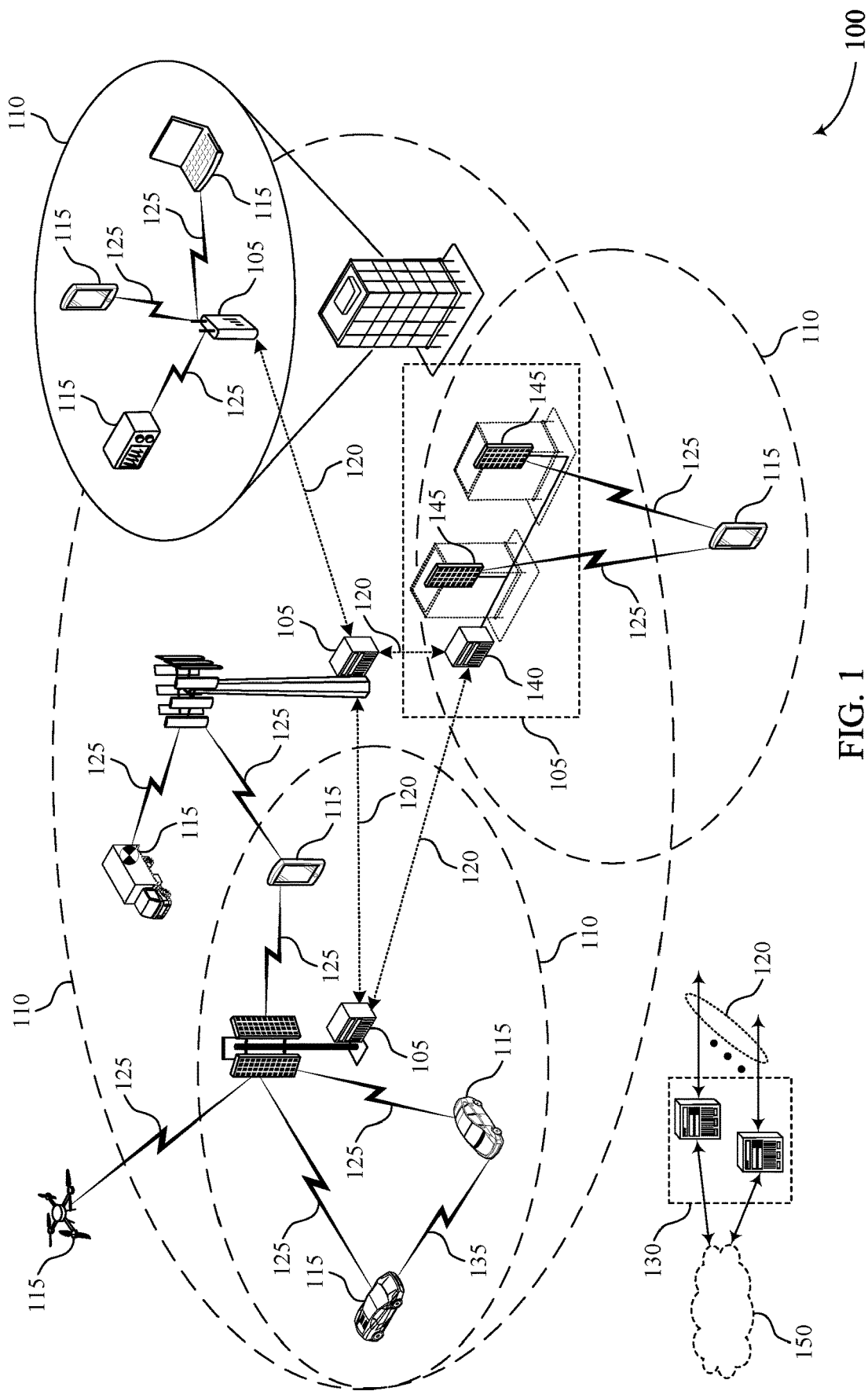
FIG. 1 illustrates an example of a system for wireless communications that supports sequence based uplink control channel coexistence in accordance with aspects of the present disclosure.

Wireless communications systems generally support uplink transmissions from user equipment (UE) to a base station. Some wireless communications systems adopt legacy techniques, such as third Generation Partnership Project (3GPP) Release 15 (R15) protocols, while other wireless communications systems adopt modern or advanced techniques (e.g., 3GPP Release 17 (R17) protocols) for communicating information. This may result in different types of uplink data transmissions being performed by UEs. For example, some UEs may communicate payload data (e.g., a physical uplink control channel (PUCCH) data) according to R17 protocols in the same resource block (e.g., in a block of physical resources of the PUCCH channel) as other UEs communicate payload data according to R15 protocols. This may result in a loss of uplink payload for both UEs when the base station is unable to recover the different uplink payload data types since they are communicated using different protocols. The loss of PUCCH data may result in the loss of a corresponding data transmission scheduled by the PUCCH data, which may further increase loss and waste of precious resources of the wireless communications system.

Aspects of the disclosure are initially described in the context of wireless communications systems. Generally, the described techniques provide for coexistence for different types of uplink data (e.g., a payload of uplink data) transmissions by disparate UE. That is, a first UE may be a modern or advanced UE performing uplink transmissions using corresponding advanced techniques, whereas a second UE may be a legacy UE performing uplink transmissions using legacy techniques. This may result in different types of uplink payload being communicated by the first UE and the second UE. Aspects of the described techniques provide mechanisms where the first and second UE can communicate first and second types of uplink payload, respectively, to a base station in a resource block by multiplexing the different types of uplink payload. In some aspects, this may include the base station transmitting or otherwise conveying a configuration signal to the first UE indicating a codebook construction configuration.

Broadly, the first UE may utilize the codebook construction configuration to construct a codebook of sequences for conveying the first type of uplink payload in the resource block. The first UE may communicate the first type of uplink payload in the resource block that is orthogonal to (e.g., multiplexed with) the second type of uplink payload being transmitted by the second UE in the resource block. This may include the first UE constructing a codebook of sequences for the first type of uplink payload according to the codebook construction configuration and then generating the first type of uplink payload for transmission using a first sequence from the codebook of sequences. The first UE may transmit the first type of uplink payload in the resource block, with the first type of uplink payload being multiplexed in the resource block with the second type of uplink payload being transmitted by the second UE. The base station may receive the first type of uplink payload in the resource block from the first UE and the second type of uplink payload in the resource block from the second UE. The base station may demultiplex the first type of uplink payload from the second type of uplink payload and then construct the codebook of sequences for the first type of uplink payload according to the codebook construction configuration provided to the first UE. The base station may decode the first type of uplink payload using the codebook of sequences.

Aspects of the disclosure are further illustrated by and described with reference to apparatus diagrams, system diagrams, and flowcharts that relate to sequence based uplink control channel coexistence.

FIG. 1 illustrates an example of a wireless communications system 100 that supports sequence based uplink control channel coexistence in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first UE (e.g., a UE 115) may receive a configuration signal indicating a codebook construction configuration for constructing a codebook of sequences for conveying a first type of uplink payload in a resource block that is orthogonal to a second type of uplink payload transmitted from a second UE (e.g., a different UE 115) in the resource block. The first type of uplink payload may use different REs of the resource block than the second type of uplink payload, and hence the two types of uplink payloads may be orthogonal in time and frequency. The demodulation reference signal (DMRS) symbols may be of the resource block may be common to the two types of uplink payloads, and the first UE may use codebook of sequences to generate a DMRS sequence for transmission in the DMRS symbols that is orthogonal a DMRS sequence of the second UE. The first UE may construct the codebook of sequences for the first type of uplink payload according to the codebook construction configuration. The first UE may generate the first type of uplink payload for transmission using a first sequence from the codebook of sequences. The first UE may transmit the first type of uplink payload in the resource block, wherein the first type of uplink payload is multiplexed in the resource block with the second type of uplink payload from the second UE.

A base station 105 may transmit, to a first UE, a configuration signal indicating a codebook construction configuration for the first UE to use for constructing a codebook of sequences for conveying a first type of uplink payload in a resource block that is orthogonal to a second type of uplink payload transmitted from a second UE. The base station 105 may receive, the first type of uplink payload in the resource block from the first UE and the second type of uplink payload in the resource block from the second UE. The base station 105 may demultiplex the first type of uplink payload from the second type of uplink payload. The base station 105 may construct the codebook of sequences for the first type of uplink payload according to the codebook construction configuration. The base station 105 may decode the first type of uplink payload based at least in part on the codebook of sequences.

Figure 2:
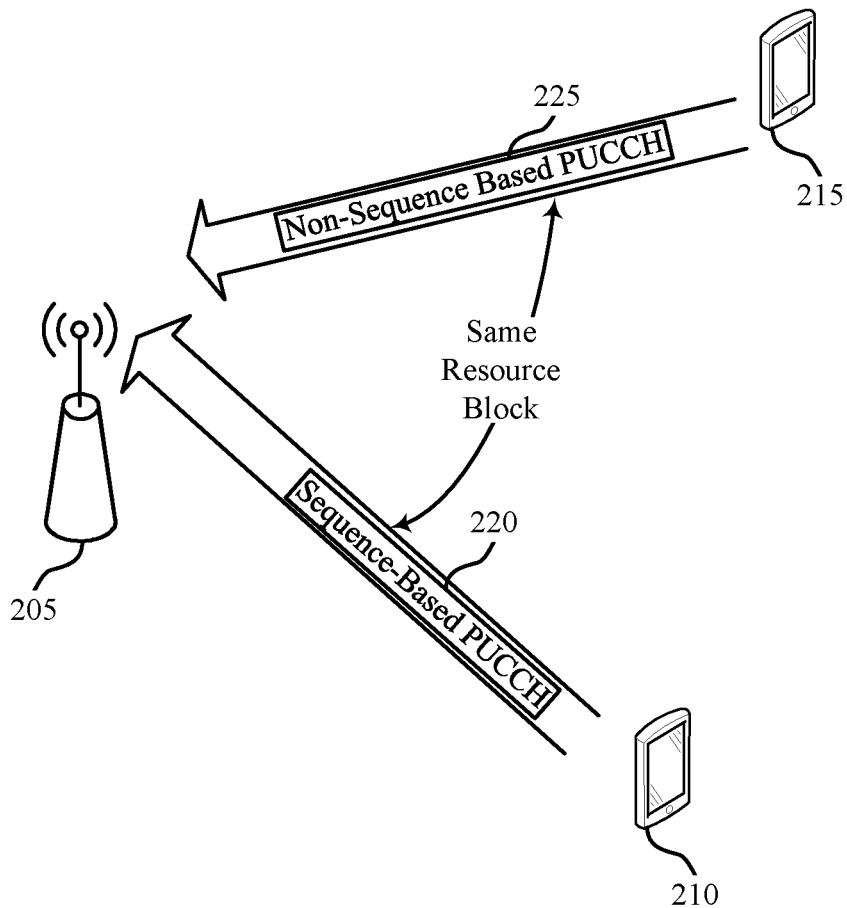
FIG. 2 illustrates an example of a wireless communications system that supports sequence based uplink control channel coexistence in accordance with aspects of the present disclosure.

FIG. 2 illustrates an example of a wireless communications system 200 that supports sequence based uplink control channel coexistence in accordance with aspects of the present disclosure. In some examples, wireless communications system 200 may implement aspects of wireless communications system 100. Wireless communications system 200 may include base station 205, UE 210, and/or UE 215, which may be examples of corresponding devices described herein. In some aspects, UE 210 may be an example of a first UE and UE 215 may be an example of a second UE.

In some aspects, UE 210 may be an advanced UE in that it is configured to support or has otherwise adopted 3GPP R17 protocols, whereas UE 215 may be a legacy UE in that it is configured to support or has otherwise adopted 3GPP R15 protocols. In some examples, this may include UE 210 transmitting sequence-based PUCCH 220 (e.g., a first type of uplink payload) in the same resource block as UE 215 transmits non-sequence based PUCCH 225 (e.g., a second type of uplink payload). However, such transmissions according to some wireless communications systems may result in the loss of the PUCCH data from UE 210 and/or UE 215. That is, transmission of sequence-based PUCCH 220 and non-sequence based PUCCH 225 in the same resource block may result in base station 205 being unable to recover the control information conveyed in the PUCCH transmissions. This may be due to collisions between sequence based PUCCH 220 and non-sequence based PUCCH 225 in the resource block.

That is, a R15 PUCCH format (e.g., PUCCH format 4) may be utilized for transmission of non-sequence based PUCCH 225. Broadly, this may include mapping demodulation reference signal (DMRS) OFDM symbols that are TDM with uplink control information (UCI) OFDM symbols. DMRS signals may be transmitted during the DMRS OFDM symbols using a cyclic shift (CS) having an index of m. QPSK modulated UCI may be transmitted on the UCI OFDM symbols, with the UCI OFDM symbols having a comb-based structure where the UCI of one UE is transmitted in one comb with the UCI of another UE being transmitted in a different comb on PUCCH. Accordingly and from the perspective of UE 215, the empty comb(s) may be used for other R15 PUCCH format 4 UEs (e.g., a R15 MU design). However, according to aspects of the described techniques these empty resource elements corresponding to the empty comb may be utilized to transmit sequence based PUCCH 220 by UE 210 in the same resource block. Generally, a resource block may refer to time, frequency, spatial, code, etc., resources being used for PUCCH transmissions. Examples of a resource block include, but are not limited to, a physical resource block (PRB), which includes 12 subcarriers in one OFDM symbol. Accordingly, sequence based PUCCH 220 and non-sequence based PUCCH 225 transmitted in the same resource block (e.g., multiplexed together) may include the sequence based PUCCH 220 being transmitted on a first subset of resources in the resource block and non-sequence based PUCCH 225 being transmitted on a second subset of resources in the resource block.

Aspects of the described techniques support R17 protocols for sequence based PUCCH 220 to use the resource elements (REs) in the DMRS symbols and the empty REs (e.g., based on the comb structure of the OFDM symbols) in the UCI OFDM symbols. In some aspects, this may include UE 210 mapping/packing the available REs from the physical domain to a virtual domain. That is, UE 210 may first mapping/pack the DMRS OFDM symbols following causality in the physical time domain. UE 210 may then map/pack empty resource elements on UCI OFDM symbols following a frequency first, time second ordering, or vice versa.

Accordingly, base station 205 may transmit or otherwise convey a configuration signal to UE 210 (e.g., via RRC signaling, MAC CE, DCI, etc.) that indicates or otherwise identifies a codebook construction configuration for UE 210 to use for constructing a codebook of sequences for conveying a first type of uplink payload (e.g., the sequence based PUCCH 220) in a resource block that is orthogonal to a second type of uplink payload (e.g., the non-sequence based PUCCH 225) from a second UE (e.g., UE 215 in this example). UE 210 may construct the codebook of sequences for the first type of uplink payload according to the codebook construction configuration and generate the first type of uplink payload for transmission using a first sequence from the codebook of sequences.

This may provide for an orthogonal sequence design on PUCCH resource(s)/RE(s)s in the virtual domain. For example, this may include UE 210 generating an orthogonal sequence pool in a virtual RE domain. In some aspects, this may be based on discrete Fourier transform (DFT) and/or DMRS transmissions. For example, the DFT may correspond to an index n and the DMRS (and/or PUCCH data) may be transmitted using CS index m (e.g., a DMRS sequence may be cyclically shifted by index m). The orthogonal sequence pool may include a set of sequences each formed by multiplying the DFT at index n by the DMRS sequence S that is cyclically shifted by index m (e.g., DFT(n)*S(CS m)). In some examples, the DFT size may be N', where N' may ignore the last virtual OFDM symbol if it is a partial symbol (e.g., does not include enough empty REs for each subcarrier in the virtual domain). That is, the partial virtual OFDM symbol may not be used to transmit R17 PUCCH (e.g., the sequence based PUCCH 220). Instead, these virtual REs in the partial virtual OFDM symbols may be filled with dummy signals in order to maintain the per-RE UE transmit power the same as in other REs. Next, UE 210 may construct a codebook of size $2^K$, where K may be a number indicated in the configuration signal. For example, the UE 210 may select to include $2^K$ sequences from the sequence pool for inclusion in the codebook of sequences. The UE 210 may select the first $2^K$ sequences, may randomly select $2^K$ from the sequence pool, pay select $2^K$ sequences in accordance with a selection criterion specified in the configuration signal, or the like, for inclusion in the codebook of sequences. The UE may then generate uplink control information (e.g., R17 PUCCH UCI), convert the uplink control information into integer I, and map the I-th codepoint in the code (e.g., I-th sequence in the codebook of sequences) to the virtual REs in the virtual domain. UE 210 may then map the REs from the virtual domain back to REs in the physical domain and transmit them in the physical domain (e.g., transmit the first type of uplink payload in the resource block) within the resource block.

As UE 215 (e.g., the R15 UE in this example) may transmit DMRS signals (and/or other PUCCH data) using a cyclic shift index m transmitted on DMRS OFDM symbols, this could lead to a CS index collision between sequence based PUCCH 220 and non-sequence based PUCCH 225. Accordingly, aspects of the described techniques provide for base station 205 to signal UE 210 (e.g., the R17 UE in this example) either an avoid list or a use list of cyclic shift indices and/or DFT indices.

For example, the configuration signal indicating the codebook construction configuration that indicates a set of cyclic shift indices and/or a set of DFT indexes for UE 210 to use for constructing the codebook of sequences. Thus, the UE 210 may use the configuration signal to construct the codebook of sequences that avoids DFT index collision, CS index collision, or both, with an uplink payload transmitted by the UE 215. Such a collision may prevent the base station 205 from being able to decode, within the same resource block, one or both of the first type of uplink payload (i.e., the sequence-based PUCCH) from the UE 210 and the second type of uplink payload (i.e., the non sequence-based PUCCH) from the UE 215.

In some examples, the configuration signal indicating the codebook construction configuration may indicate a set of cyclic shift indices and/or a set of DFT indices for UE 210 to avoid when constructing the codebook of sequences. In this example, UE 210 may determine that at least one cyclic shift index from the set of cyclic shift indices and/or at least one DFT index from the set of DFT indices is to be avoided. Accordingly, UE 210 may replace the cyclic shift index and/or DFT index with the virtual cyclic shift index and/or virtual DFT index in the codebook of sequences. In this example, UE 210 may generate a virtual set of cyclic shift indices and/or virtual set of DFT indices, construct the codebook of sequences based on the virtual set of cyclic shift indices and/or the virtual set of DFT indices, and map the virtual set of cyclic shift indices and/or virtual set of DFT indices to a real set of cyclic shift indices and/or a real set of DFT indices.

Accordingly, UE 210 may transmit the sequence based PUCCH 220 (e.g., the first type of uplink payload) in the same resource block as UE 215 transmits the non-sequence based PUCCH 225 to base station 205. As discussed, the sequence based PUCCH 220 may be an example of a R17 PUCCH UCI where the non-sequence based PUCCH 225 may be an example of a R15 PUCCH UCI. Base station 205 may receive the transmissions from UE 210 and UE 215 and demultiplex a first type of uplink payload from the second type of uplink payload. For example, base station 205 may demultiplex the first type of uplink payload from the second type of uplink payload in the frequency domain, the time domain, the spatial domain, the code domain, and the like.

This may allow base station 205 to further process the sequence based PUCCH 220 (e.g., the first type of uplink payload data) and the non-sequence based PUCCH 225 according to their respective protocols. For example, base station 205 may further process and decode the non-sequence based PUCCH 225 according to R15 protocols and may further process and decode the sequence based PUCCH 220 according to R17 protocols (e.g., based at least in part on the codebook construction configuration signaled to UE 210).

For example, base station 205 may reverse the process taken by UE 210 when building the sequence based PUCCH 220 for transmission to base station 205. This may include base station 205 constructing the codebook of sequences for the first type of uplink payload (e.g., the sequence based PUCCH 220) based on the codebook construction configuration signaled to UE 210, and then decoding the first type of uplink payload using the codebook of sequences.

This may include base station 205 generating a virtual set of cyclic shift indices and/or a virtual set of DFT indices and constructing the codebook of sequences based on the virtual sets. Base station 205 may map the virtual set of cyclic shift indices and/or the virtual set of DFT indices to a real set of cyclic shift indices and/or a real set of DFT indices (e.g., in the real or physical domain).

This may include base station 205 generating an orthogonal sequence pool by mapping REs associated with the orthogonal sequence pool in the physical domain to REs in the virtual domain. Base station 205 may form or otherwise construct the virtual codebook of sequences according to this mapping. Base station 205 may map the plurality of virtual REs in the virtual domain to a plurality of REs in the physical domain of the resource block, e.g., based on the received first type of uplink payload. Base station 205 may convert the first type of uplink payload data into an integer corresponding to a first sequence from the virtual codebook of sequence to further process and decode the information indicated in the first type of uplink payload (e.g., to decode the sequence based PUCCH 220).

Accordingly, aspects of the described techniques map/pack physical DMRS symbol REs into the virtual domain first, e.g., to make sure the DMRS symbols in the virtual domain are whole or non-partial OFDM symbols. This may prevent FDMing DMRS with empty UE REs. Because after mapping from the virtual domain back to the physical domain, the physical REs on DMRS symbols are shared between R15 and R17 PUCCH, the described techniques ensure a whole sequence S (e.g., the DMRS) is transmitted on the physical REs on the DMRS symbols in R17 PUCCH, such that the orthogonality between R17 PUCCH and R15 PUCCH can be maintained on those DMRS symbols in the physical RE domain.

Aspects of the described techniques may be used if the channel is almost constant in both time and frequency domain, e.g., meaning with small Doppler and delay spread. When the Doppler and/or delay spread is/are large, the map/packing/squeeze techniques described herein may be similar to random interleaving to combat high Doppler, which effectively randomized the Doppler and delay spread effect on the received signal. Accordingly, the described techniques are robust to high Doppler and delay spread.

Figure 3:
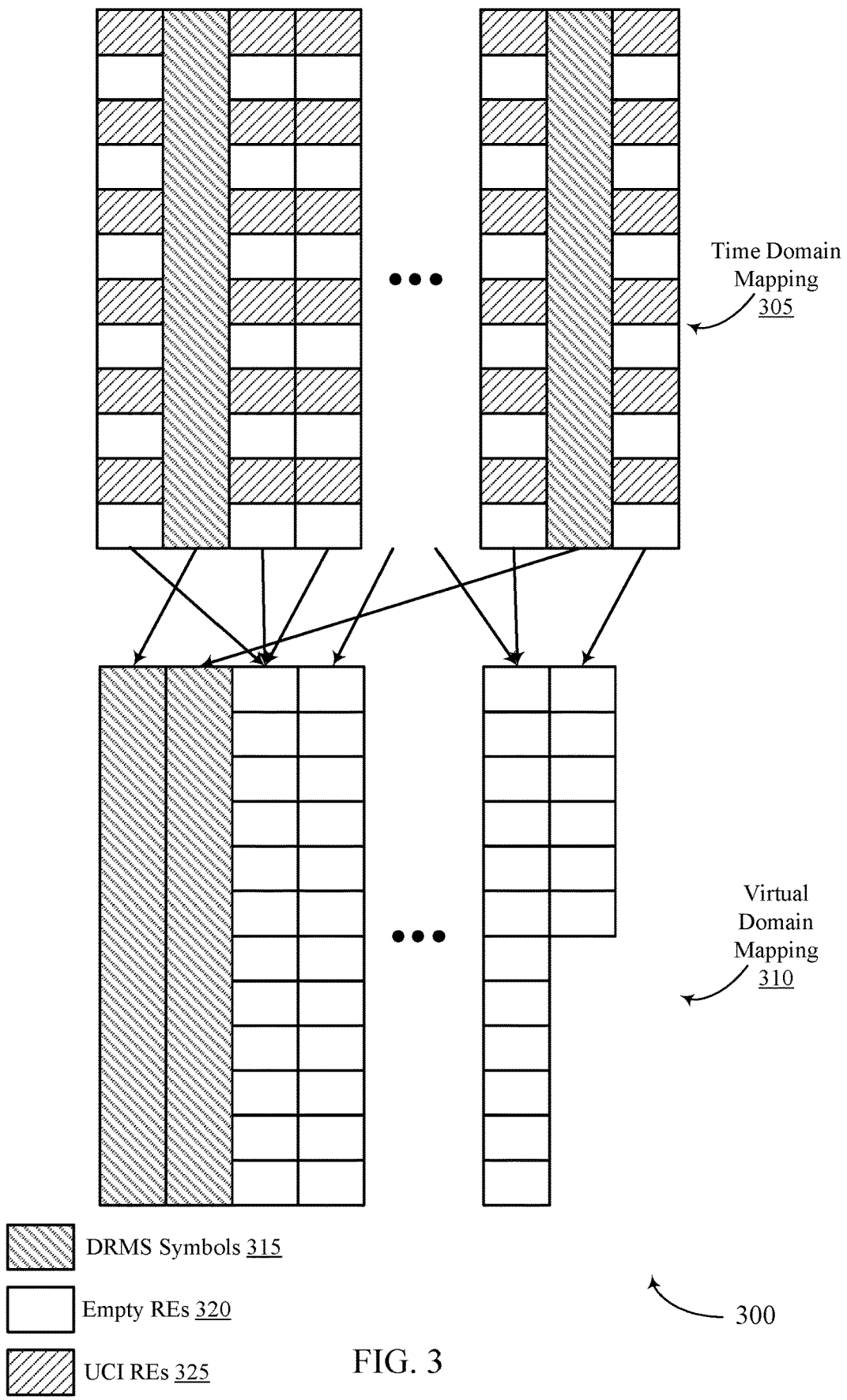
FIG. 3 illustrates an example of a mapping configuration that supports sequence based uplink control channel coexistence in accordance with aspects of the present disclosure.

FIG. 3 illustrates an example of a mapping configuration 300 that supports sequence based uplink control channel coexistence in accordance with aspects of the present disclosure. In some examples, mapping configuration 300 may implement aspects of wireless communications systems 100 and/or 200. Aspects of mapping configuration 300 may be implemented by a UE and/or base station, which may be examples of the corresponding devices described herein.

Aspects of the described techniques may include a first UE (e.g., a R17 UE) being configured with a configuration signal (e.g., RRC, MAC CE, DCI, etc.) that identifies or otherwise indicates a codebook construction configuration that the first UE will use for constructing a codebook of sequences for conveying a first type of uplink payload (e.g., a sequence based PUCCH). The first UE may construct the codebook of sequences for the first type of uplink payload according to the codebook construction configuration, generate the first type of uplink payload for transmission using a sequence from the codebook of sequences, and transmit the first type of uplink payload in the resource block. The resource block may also include a second type of uplink payload (e.g., any non-sequence based PUCCH) transmitted from a second UE.

Mapping configuration 300 illustrates one non-limiting example of the first UE creating, according to the codebook construction configuration, a virtual domain my mapping/repacking REs from the time domain mapping 305 into the virtual domain mapping 310.

As discussed above, a non-sequence based PUCCH (e.g., the second type of uplink payload) may be transmitted according to different techniques that are used to transmit sequence based PUCCH (e.g., the first type of uplink payload). For example, the time domain mapping 305 illustrates one example configuration used for transmitting a R15 PUCCH format 4. This may include DMRS symbols 315 (e.g., denoted as S) being mapped to N orthogonal symbols in the time domain (with two DMRS symbols 315 being shown by was of example only). The DMRS symbols 315 may span one or more transmission opportunities, transmission occasions, mini-slots, slots, and the like. This may also include UCI REs 325, which are the REs in the real or physical domain that are used to transmit the PUCCH. As illustrated, the UCI REs 325 may span multiple symbols in the time domain mapping 305 according to a comb pattern where some REs alternate between a UCI REs 325 and other REs are empty REs 320. In some configurations, the empty REs 320 could be used by other UEs for transmitting PUCCH.

However, the first UE in this scenario may have sequence based PUCCH (e.g., the first type of uplink payload) for transmission, and may therefore map the REs from the time domain mapping 305 to the virtual domain mapping 310. For example, the first UE may map the DMRS symbols 315 to the first two symbols in the virtual domain, and then add the empty REs 320 to the virtual domain mapping 310. As illustrated, this may result in a partial symbol (e.g., the last symbol of the virtual domain mapping 310) holding remnant empty REs 320. For this partial symbol, the first UE may not use the empty REs 320 in the virtual domain mapping 310 (e.g., may transmit dummy signals in those empty REs 320 in the partial symbol.

Instead, the first UE transmitting R17 sequence based PUCCH may use the REs in the DMRS symbols 315 and the empty REs 320 in the UCI symbols (e.g., the symbols including UCI REs 325) for conveying the first type of uplink payload. The first UE may exclude UCI REs 325 in the UCI symbols. The first UE may map/pack the not-excluded REs (e.g., the empty REs 320, other than those in the partial symbol) from the time domain mapping 305 (e.g., the real or physical domain) to the virtual domain mapping 310. The first UE may map/pack the DMRS symbols 315 first following causality in the physical domain, and then map/pack empty REs 320 on the UCI OFDM symbols, following a frequency first, time second ordering, or vice versa.

Accordingly, the first UE may generate an orthogonal sequence design in the virtual domain mapping 310. This may include an orthogonal sequence design on the mapped/packed PUCCH resources/REs in the virtual domain mapping 310. This may include the first UE generating an orthogonal sequence pool in the virtual domain (e.g., according to the codebook construction configuration). In some aspects, this may be based on DFT and/or DMRS transmissions (denoted as S(CS m)). For example, the DFT may correspond to an index n and the DMRS (and/or PUCCH data, such as the first type of uplink payload) may be transmitted using CS index m. In some examples, the DFT size may be N', where N' may ignore the last virtual OFDM symbol if it is in a partial symbol (e.g., does not include enough empty REs 320 for each subcarrier in the virtual domain mapping 310). That is, the partial virtual OFDM symbol may not be used to transmit R17 PUCCH (e.g., the sequence based PUCCH). Instead, these virtual REs in the partial virtual OFDM symbols may be filled with dummy signals in order to maintain the per-RE UE transmit power the same as in other REs. Next, the UE may construct a codebook of sequence having a size 2^K and the convert the R17 PUCCH UCI into integer I, map the I-th codepoint in the code to the virtual REs in the virtual domain (e.g., the empty REs 320 in the virtual domain mapping 310). The first UE may then map the REs from the virtual domain back to REs in the physical domain (e.g., following the structure of the time domain mapping 305, but carrying the first type of uplink payload) and transmit them in the physical domain (e.g., transmit the first type of uplink payload in the resource block).

Accordingly, mapping configuration 300 illustrates an example where the sequence based PUCCH is transmitted in the same resource block with the non-sequence based PUCCH. This may support coexistence between UEs transmitting different types of uplink payload to a base station within a same resource block. For example, a Rel-17 sequence based PUCCH may coexist with Rel-15 PUCCH format 4 in same RB permitting the base station to receive and decode each.

Figure 4:
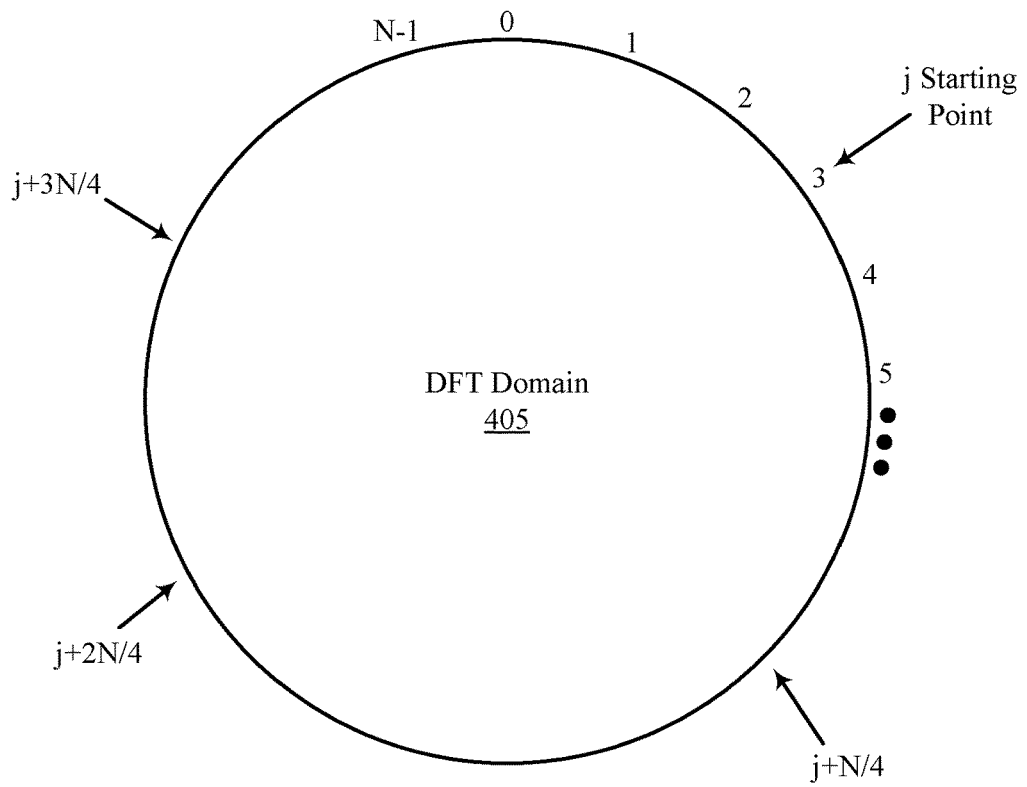
FIG. 4 illustrates an example of a codebook construction configuration that supports sequence based uplink control channel coexistence in accordance with aspects of the present disclosure.
Figure 4:
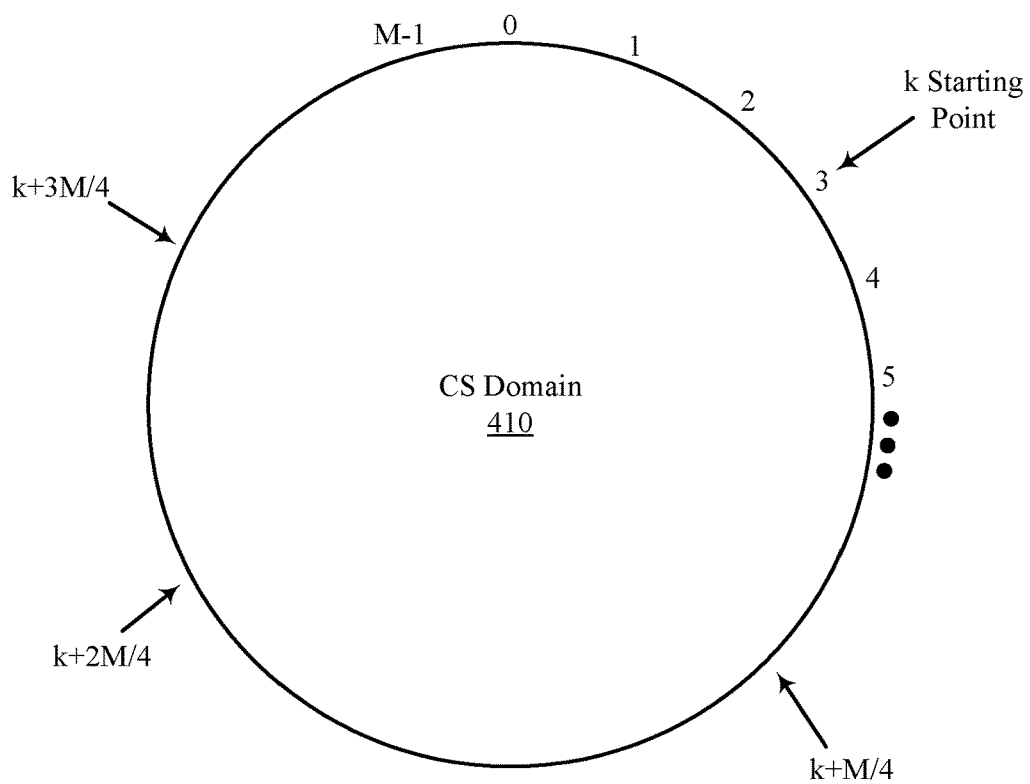

FIG. 4 illustrates an example of a codebook construction configuration 400 that supports sequence based uplink control channel coexistence in accordance with aspects of the present disclosure. In some examples, codebook construction configuration 400 may implement aspects of wireless communications systems 100 and/or 200, and/or mapping configuration 300. Aspect of codebook construction configuration 400 may be implemented by a base station and/or UE, which may be examples of the corresponding devices described herein.

Aspects of the described techniques may include a first UE (e.g., a R17 UE) being configured with a configuration signal (e.g., RRC, MAC CE, DCI, etc.) that identifies or otherwise indicates a codebook construction configuration that the first UE will use for constructing a codebook of sequences for conveying a first type of uplink payload (e.g., a sequence based PUCCH). The first UE may construct the codebook of sequences for the first type of uplink payload according to the codebook construction configuration, generate the first type of uplink payload for transmission using a sequence from the codebook of sequences, and transmit the first type of uplink payload in the resource block. The resource block may also include a second type of uplink payload (e.g., any non-sequence based PUCCH) transmitted from a second UE.

As discussed above, a R15 UE (e.g., a second UE in this example) may transmit S(CS index m) on DMRS OFDM symbols. This may create the situation where a R17 UE (e.g., the first UE in this example) transmitting UCI in the resource block uses the same CS index m, which would create a cyclic shift index collision at the base station. This may result in both PUCCH transmissions being lost.

Accordingly, aspects of the described techniques support the base station transmitting a configuration signal (e.g., via RRC signaling, MAC CE, DCI, etc.) to the first UE that identifies or otherwise identifies a codebook construction configuration for the first UE to use for constructing a codebook of sequences for conveying a first type of uplink payload (e.g., the sequence based PUCCH) in a resource block that is orthogonal to a second type of uplink payload data transmitted from a second UE in the resource block (e.g., the first type of uplink payload is orthogonal to the second type of uplink payload in the resource block).

Codebook construction configuration 400 illustrates various aspects of the codebook construction configuration that may be signaled to the first UE from the base station. In some aspects, this may include the base station identifying the cyclic shift indices that the first UE can use, or cannot use, when constructing the codebook of sequences. For example, the configuration signal may indicate a set of cyclic shift indices and/or a set of DFT indices to use for constructing the codebook of sequences. That is, the base station may explicitly signal the codebook (size 2^K) that the first UE is supposed to use, e.g., explicitly signal in total 2^K pairs of DFT index n, CS index m to the first UE.

In another example, the configuration signal may indicate a set of cyclic shift indices and/or a set of DFT indices that the first UE is to avoid (e.g., not use) for constructing the codebook of sequences. That is, the base station may signal an avoid list, such as avoid CS index m1, CS index m2, etc., and the first UE may avoid using these indices when constructing the codebook of sequences from the sequence pool.

For example, when the base station transmits an avoid list such as CS index m1, CS index m2, etc., the first UE may have different options available on how to construct the codebook of sequences. In one option, the first UE may not exclude any DFT/CS index when constructing the DFT domain 405 and/or the CS domain 410. Instead, the first UE may follow the signaled starting point (e.g., j starting point and/or k starting point) and follow a maximum distance criterion (e.g., how far within DFT domain 405 and/or CS domain 410, such as j+N/4, k+3M/4, etc.) to construct the codebook of sequences. If a codepoint in the constructed codebook of sequences falls in the avoid list, the first UE may replace it with an adjacent codepoint such as DFT index+1 or CS index+1 until the new codepoint is not in the avoid list. Accordingly, the first UE may determine that at least CS index of the set of CS indices and/or at least one DFT index of the set of DFT indices used to construct the codebook of sequences is to be avoided. In this situation, the first UE may replace the at least one CS index and/or the at least one DFT index with a virtual CS index and/or a virtual DFT index in the codebook of sequences In another option, the first UE may exclude the DFT/CS indices in the avoid list when constructing the codebook of sequences using the DFT domain 405 and/or CS domain 410. That may include effectively creating a virtual DFT index domain and/or a virtual CS index domain. The first UE may follow the base station signaled starting point and maximum distance criteria when constructing the codebook of sequences in the virtual DFT/CS domains. The first UE may then map back the constructed virtual codepoints into the physical domain (e.g., DFT domain 405 and/or CS domain 410). Accordingly, the first UE may generate a virtual set of CS indices and/or a virtual set of DFT indices and construct the codebook of sequences based at least in part on the virtual set of CS indices and/or the virtual set of DFT indices. The first UE may map, based at least in part on the configuration signal, the virtual set of CS indices and/or the virtual set of DFT indices to a real set of CS indices and/or a real set of DFT indices.

Figure 5:
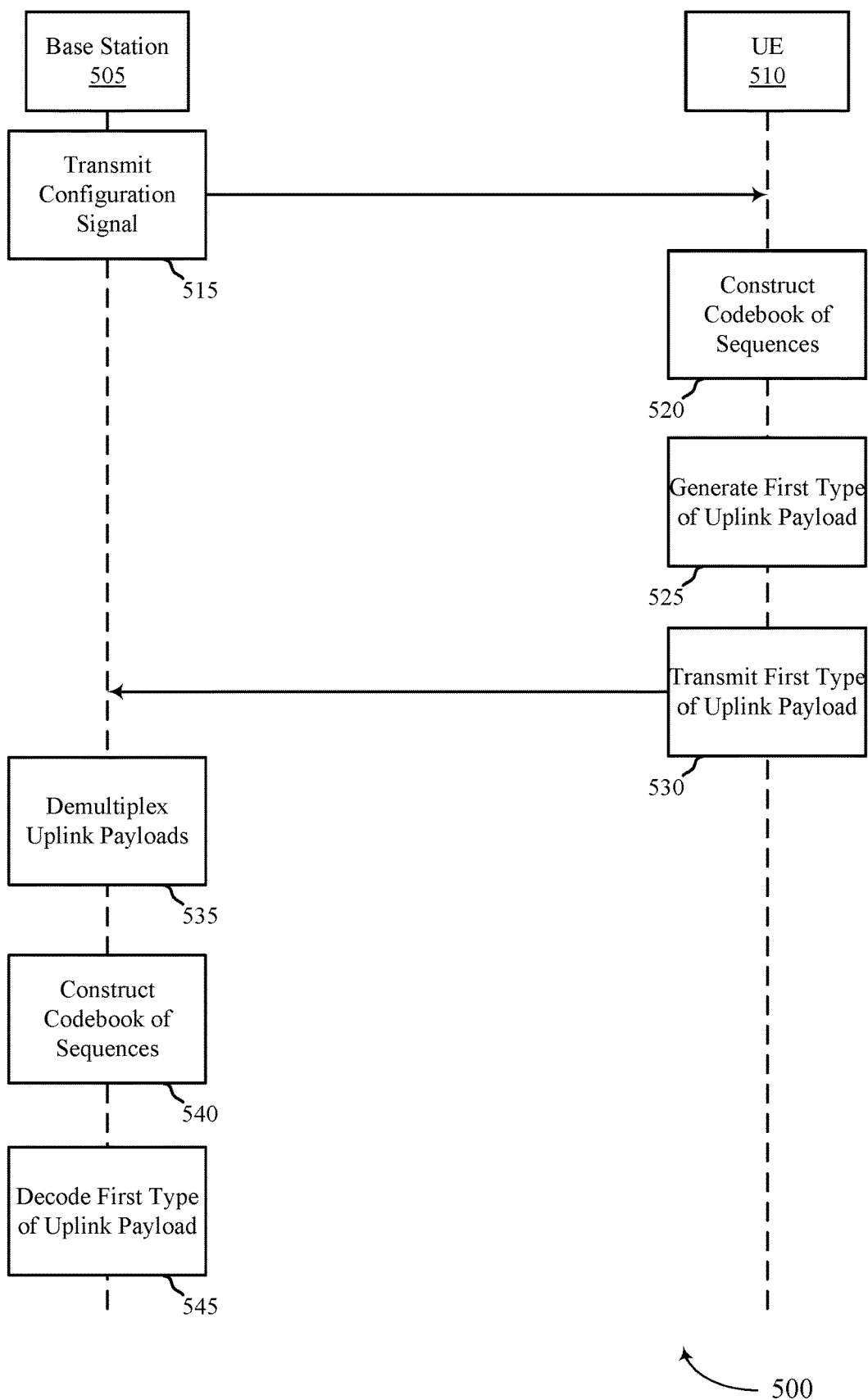
FIG. 5 illustrates an example of a process that supports sequence based uplink control channel coexistence in accordance with aspects of the present disclosure.

FIG. 5 illustrates an example of a process 500 that supports sequence based uplink control channel coexistence in accordance with aspects of the present disclosure. In some examples, process 500 may implement aspects of wireless communications systems 100 and/or 200, mapping configuration 300, and/or codebook construction configuration 400. Aspects of process 500 may be implemented by base station 505 and/or UE 510, which may be examples of the corresponding devices described herein. In some aspects, UE 510 may be an example of a first UE (e.g., a R17 UE) transmitting sequence based PUCCH.

At 515, base station 505 may transmit (and UE 510 may receive) a configuration signal indicating a codebook construction configuration for constructing a codebook of sequences for conveying a first type of uplink payload (e.g., sequence based PUCCH) in a resource block that is orthogonal to a second type of uplink payload (non-sequence based PUCCH) transmitted from a second UE in the resource block. In some aspects, the configuration signal may be an example of RRC signaling, MAC CE, DCI, and the like.

In some aspects, the configuration signal may indicate a set of CS indices and/or DFT indices for UE 510 to use for constructing the codebook of sequences. In some aspects, the configuration signal may indicate a set of CS indices and/or DFT indexes for UE 510 to avoid when constructing the codebook of sequences.

In some aspects, the configuration signal may indicate a starting index (e.g., j starting point and/or k starting point) and quantity of indices (e.g., a maximum distance criteria) for a set of CS indices and/or DFT indices for UE 510 to use for constructing the codebook of sequences.

At 520, UE 510 may construct the codebook of sequences for the first type of uplink payload according to the codebook construction configuration. In some aspects, this may include UE 510 generating an orthogonal sequence pool by mapping REs associated with the orthogonal sequence pool in the physical domain to REs in a virtual domain. UE 510 may construct a virtual codebook of sequences according to the mapping and convert the first type of uplink payload data into an integer corresponding to a first sequence from the virtual codebook of sequences. UE 510 may map the first sequence to a plurality of virtual REs in the virtual domain and map the plurality virtual REs in the virtual domain to a plurality of physical REs of the resource block in the physical domain for transmitting the first type of uplink payload data in the resource block.

In some aspects, this may include UE 510 determining that at least one CS index of a set of CS indices and/or a DFT index of a set of DFT indices use to construct the codebook of sequences is to be avoided. Accordingly, UE 510 may replace the at least one CS index and/or DFT index with the virtual CS index and/or virtual DFT index in the codebook of sequences.

In some aspects, this may include UE 510 generating a virtual set of CS indices and/or a virtual set of DFT indices and constructing the codebook of sequences based on the virtual sets. UE 510 may map the virtual set of CS indices and/or the virtual set of DFT indices to a real set of CS indices and/or a real set of DFT indices.

At 525, UE 510 may generate the first type of uplink payload for transmission using a first sequence from the codebook of sequences. For example, the UE 510 may convert Rel-17 PUCCH UCI into integer I, and map the I-th codepoint (e.g., a sequence) in the codebook of sequences) to the virtual REs in virtual domain. The UE 510 may then map the REs from the virtual domain back to physical RE domain to generate the first type of upload payload for transmission.

At 530, UE 510 may transmit (and base station 505 may receive) the first type of uplink payload in the resource block. The first type of uplink payload may be multiplexed in the resource block with the second type of uplink payload from the second UE.

At 535, base station 505 may demultiplex the first type of uplink payload from the second type of uplink payload.

At 540, base station 505 may construct the codebook of sequences for the first type of uplink payload according to the codebook construction configuration. In some aspects, this may include base station 505 generating an orthogonal sequence pool by mapping REs associated with the orthogonal sequence pool in the physical domain to REs in a virtual domain. Base station 505 may construct the virtual codebook of sequences according to the mapping and convert uplink payload data (e.g., the first type of uplink payload) into an integer corresponding to a first sequence in the virtual codebook of sequences. Base station 505 may map the first sequence to a plurality virtual REs in the virtual domain and map the plurality virtual REs in the virtual domain to a plurality of physical REs of the resource block in the physical domain for receiving the first type of uplink payload in the resource block.

At 545, base station 505 may decode the first type of uplink payload based on the codebook of sequences.

Figure 6:
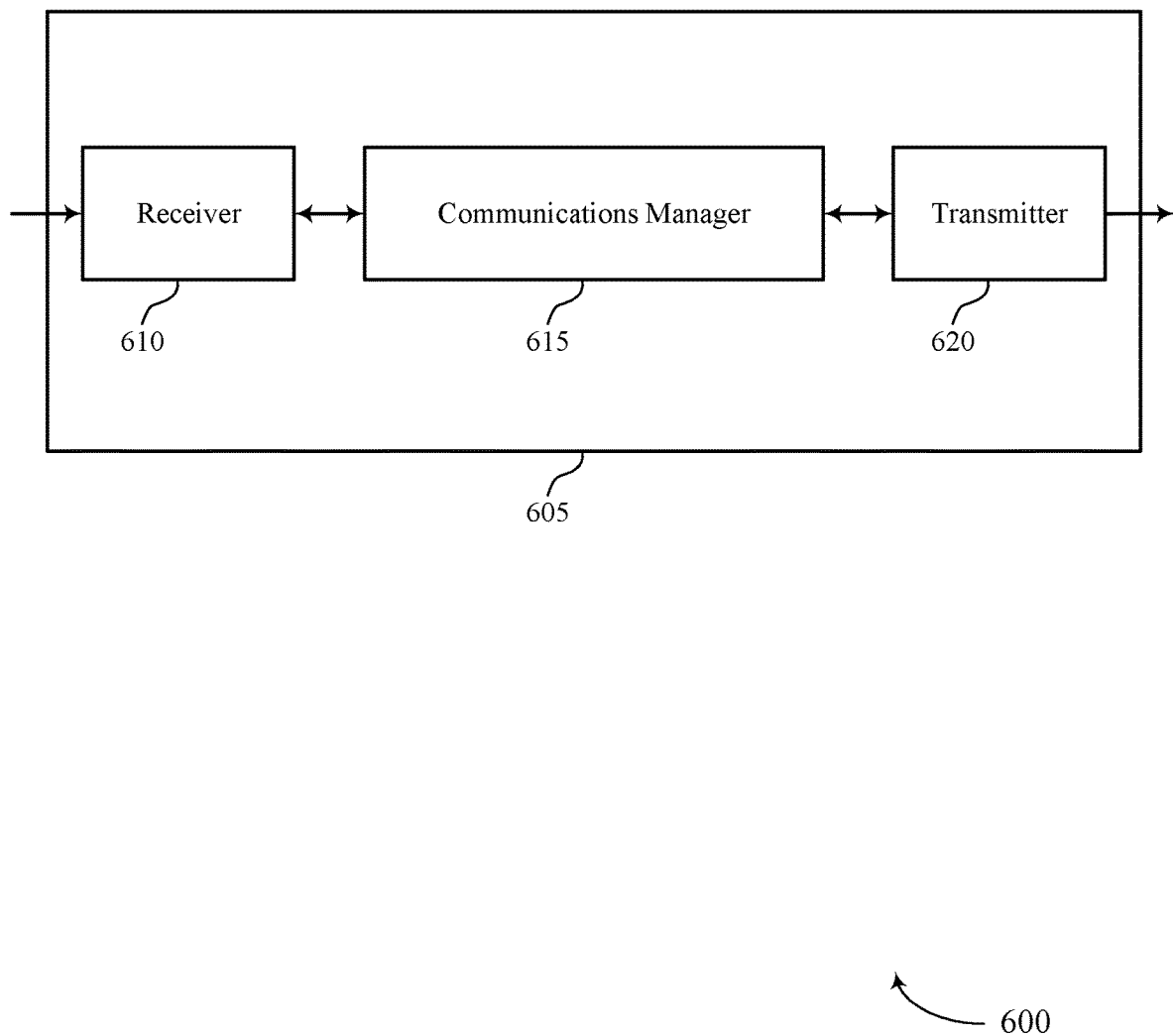
FIGS. 6 and 7 show diagrams of devices that support sequence based uplink control channel coexistence in accordance with aspects of the present disclosure.

FIG. 6 shows a diagram 600 of a device 605 that supports sequence based uplink control channel coexistence in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sequence based uplink control channel coexistence, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a configuration signal indicating a codebook construction configuration for constructing a codebook of sequences for conveying a first type of uplink payload in a resource block that is orthogonal to a second type of uplink payload transmitted from a second UE in the resource block, construct the codebook of sequences for the first type of uplink payload according to the codebook construction configuration, generate the first type of uplink payload for transmission using a first sequence from the codebook of sequences, and transmit the first type of uplink payload in the resource block, where the first type of uplink payload is multiplexed in the resource block with the second type of uplink payload from the second UE. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
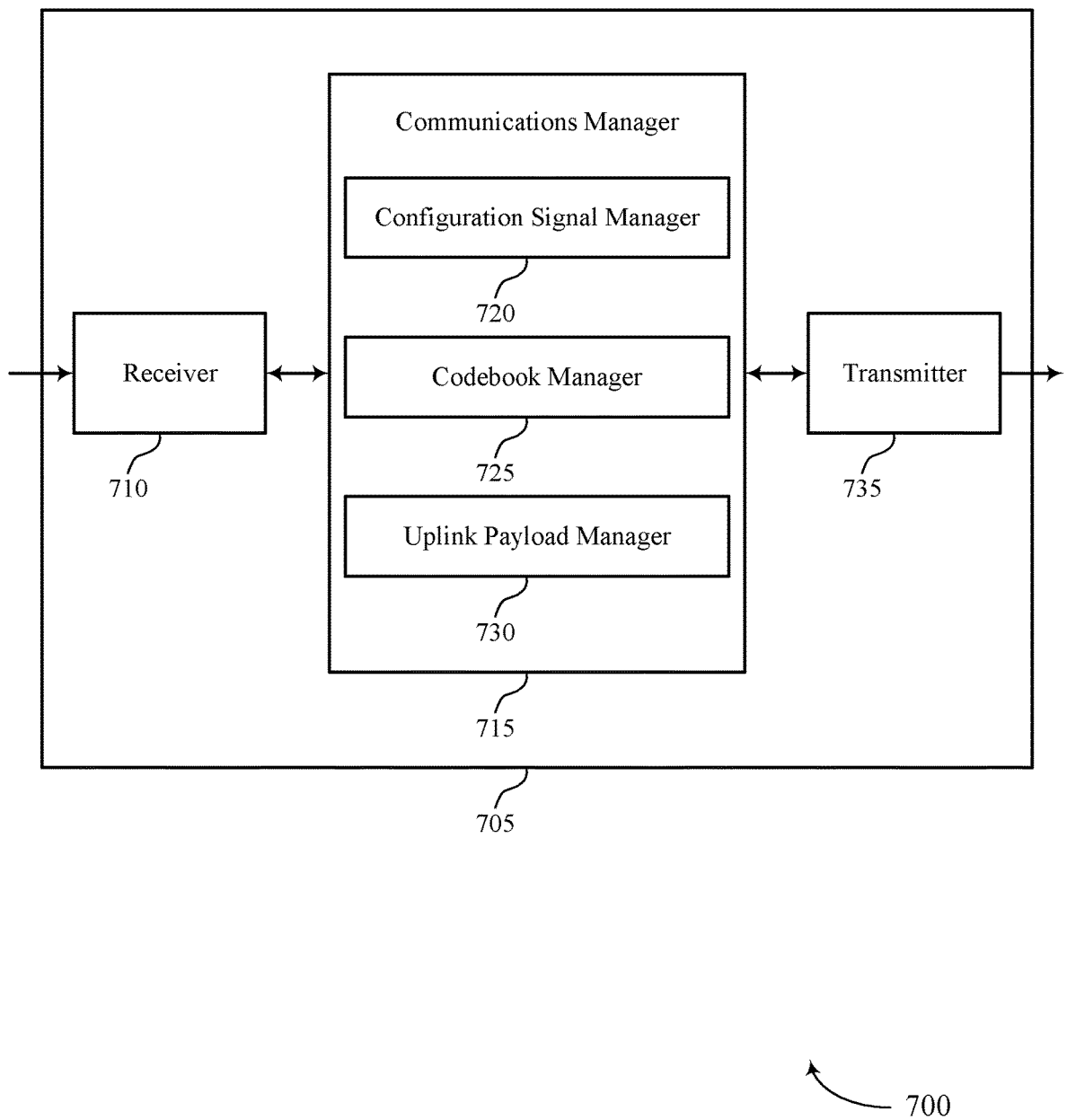

FIG. 7 shows a diagram 700 of a device 705 that supports sequence based uplink control channel coexistence in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to sequence based uplink control channel coexistence, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration signal manager 720, a codebook manager 725, and an uplink payload manager 730. The communications manager 715 may be an example of aspects of the communications manager 910 described herein.

The configuration signal manager 720 may receive a configuration signal indicating a codebook construction configuration for constructing a codebook of sequences for conveying a first type of uplink payload in a resource block that is orthogonal to a second type of uplink payload transmitted from a second UE in the resource block.

The codebook manager 725 may construct the codebook of sequences for the first type of uplink payload according to the codebook construction configuration and generate the first type of uplink payload for transmission using a first sequence from the codebook of sequences.

The uplink payload manager 730 may transmit the first type of uplink payload in the resource block, where the first type of uplink payload is multiplexed in the resource block with the second type of uplink payload from the second UE.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
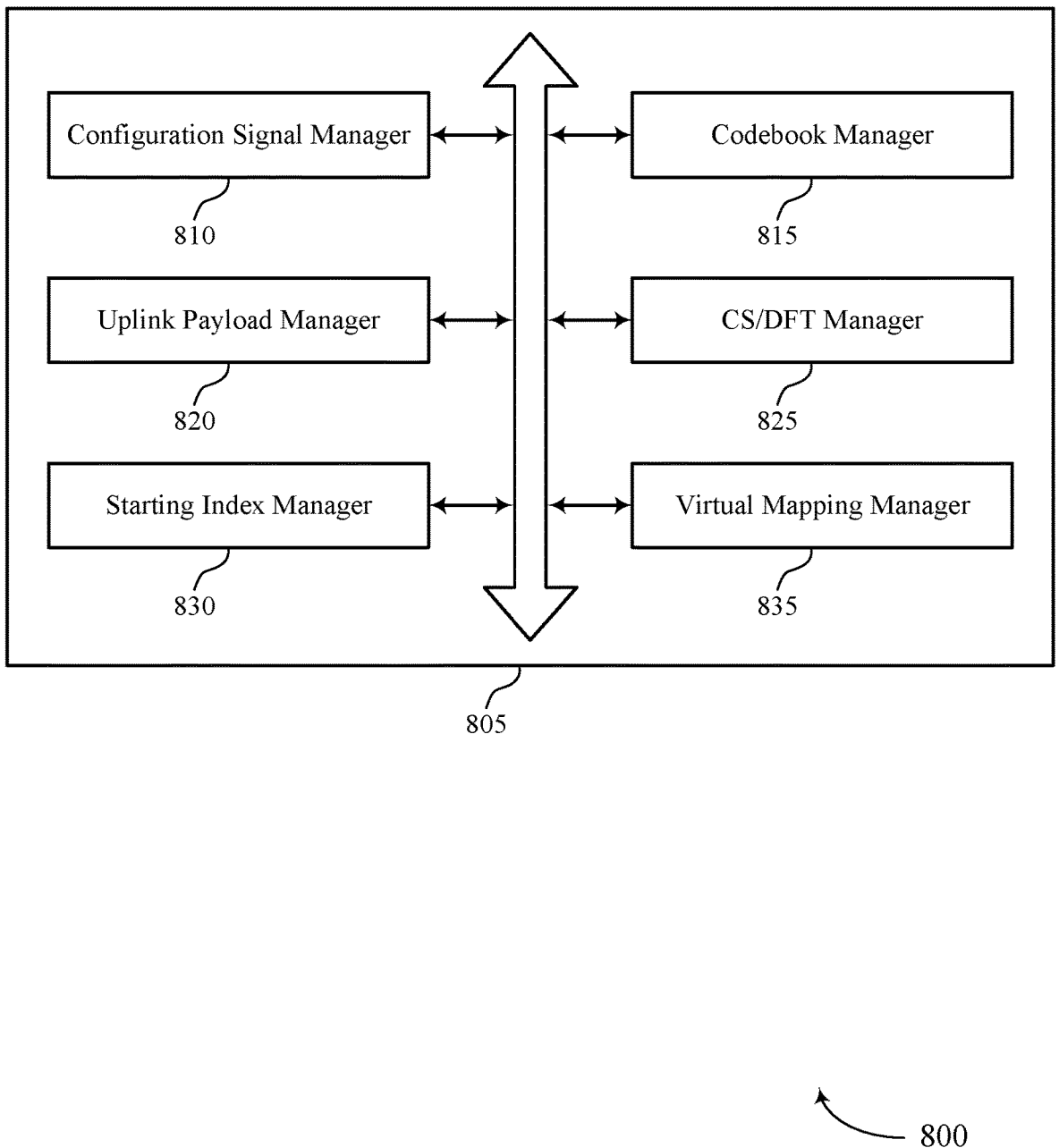
FIG. 8 shows a diagram of a communications manager that supports sequence based uplink control channel coexistence in accordance with aspects of the present disclosure.

FIG. 8 shows a diagram 800 of a communications manager 805 that supports sequence based uplink control channel coexistence in accordance with aspects of the present disclosure. The communications manager 805 may be an example of aspects of a communications manager 615, a communications manager 715, or a communications manager 910 described herein. The communications manager 805 may include a configuration signal manager 810, a codebook manager 815, an uplink payload manager 820, a CS/DFT manager 825, a starting index manager 830, and a virtual mapping manager 835. Each of these modules may communicate, directly or indirectly, with one another (e.g., via one or more buses).

The configuration signal manager 810 may receive a configuration signal indicating a codebook construction configuration for constructing a codebook of sequences for conveying a first type of uplink payload in a resource block that is orthogonal to a second type of uplink payload transmitted from a second UE in the resource block. In some examples, receiving the configuration signal that includes at least one of a RRC signal, a MAC CE, a DCI, or a combination thereof. In some cases, the first type of uplink payload includes a PUCCH payload and the second type of uplink payload includes a legacy PUCCH payload.

The codebook manager 815 may construct the codebook of sequences for the first type of uplink payload according to the codebook construction configuration. In some examples, the codebook manager 815 may generate the first type of uplink payload for transmission using a first sequence from the codebook of sequences.

The uplink payload manager 820 may transmit the first type of uplink payload in the resource block, where the first type of uplink payload is multiplexed in the resource block with the second type of uplink payload from the second UE.

The CS/DFT manager 825 may receive the configuration signal indicating the codebook construction configuration that indicates a set of cyclic shift indices, a set of DFT indices, or a combination, to use for constructing the codebook of sequences. In some examples, the CS/DFT manager 825 may receive the configuration signal indicating the codebook construction configuration that indicates a set of cyclic shift indices, a set of DFT indices, or a combination thereof, to avoid when constructing the codebook of sequences.

The starting index manager 830 may receive the configuration signal indicating the codebook construction configuration that indicates a starting index and quantity of indices for a set of cyclic shift indices, a set of DFT indices, or a combination thereof, to use for constructing the codebook of sequences. In some examples, the starting index manager 830 may determine that at least one cyclic shift index of the set of cyclic shift indices, at least one DFT index of the set of DFT indices, or a combination thereof, used to construct the codebook of sequences is to be avoided.

In some examples, the starting index manager 830 may replace the at least one cyclic shift index, the at least one DFT index, or combination thereof, with a virtual cyclic shift index, a virtual DFT index, or combination thereof, in the codebook of sequences. In some examples, the starting index manager 830 may generate a virtual set of cyclic shift indices, a virtual set of DFT indices, or a combination thereof. In some examples, the starting index manager 830 may construct the codebook of sequences based on the virtual set of cyclic shift indices, the virtual set of DFT indices, or the combination thereof. In some examples, the starting index manager 830 may map, based on the configuration signal, the virtual set of cyclic shift indices, the virtual set of DFT indices, or combination thereof, to a real set of cyclic shift indices, a real set of DFT indices, or combinations thereof.

The virtual mapping manager 835 may generate an orthogonal sequence pool by mapping resource elements associated with the orthogonal sequence pool in the physical domain to resource elements in a virtual domain. In some examples, the virtual mapping manager 835 may construct a virtual codebook of sequences according to the mapping. In some examples, the virtual mapping manager 835 may convert uplink payload data into an integer corresponding to a first sequence from the virtual codebook of sequences. In some examples, the virtual mapping manager 835 may map the first sequence to a set of virtual resource elements in the virtual domain. In some examples, the virtual mapping manager 835 may map the set of virtual resource elements in the virtual domain to a set of physical resource elements of the resource block in a physical domain for transmitting the first type of uplink payload in the resource block.

Figure 9:
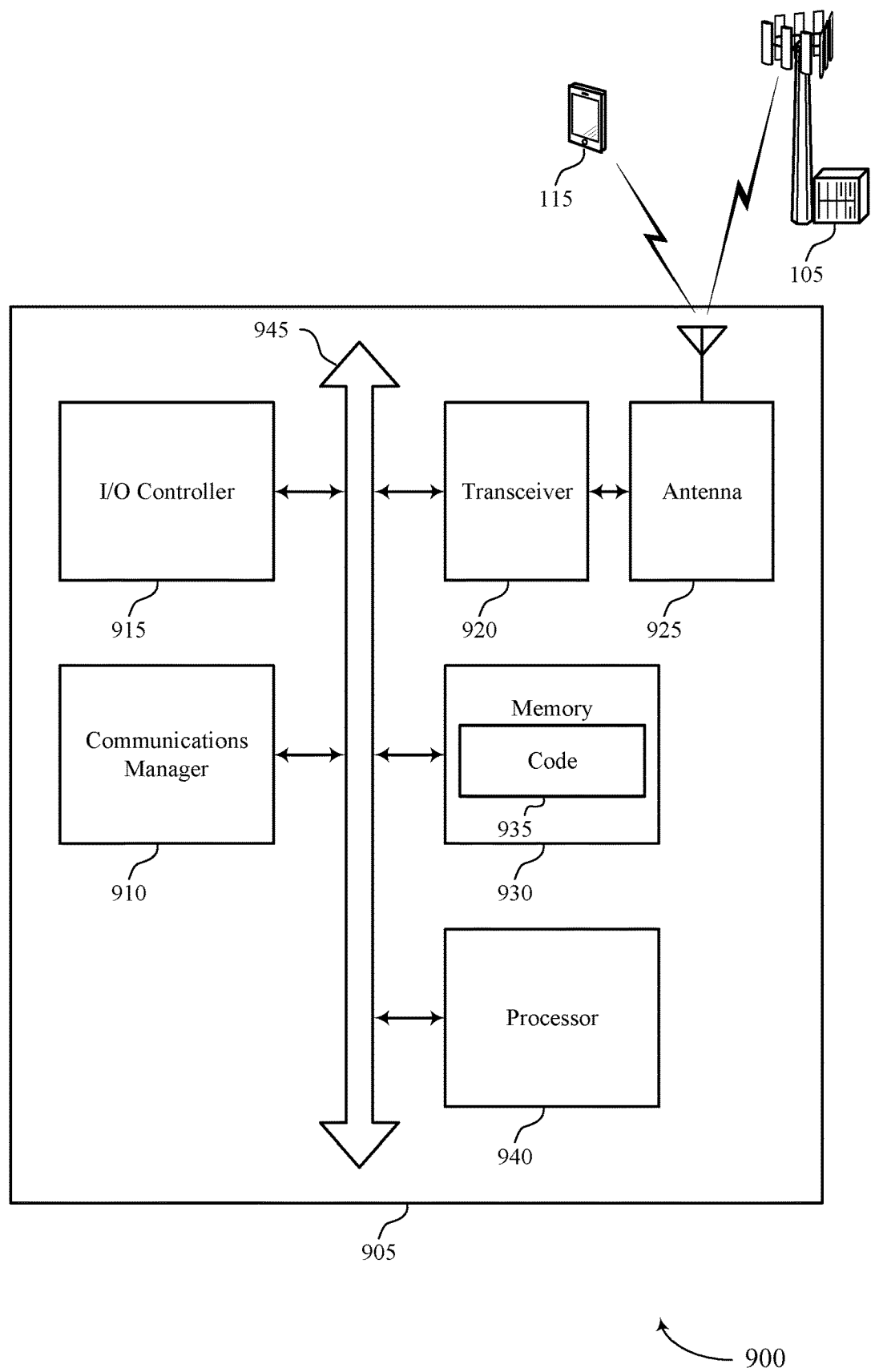
FIG. 9 shows a diagram of a system including a device that supports sequence based uplink control channel coexistence in accordance with aspects of the present disclosure.

FIG. 9 shows a diagram of a system 900 including a device 905 that supports sequence based uplink control channel coexistence in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a configuration signal indicating a codebook construction configuration for constructing a codebook of sequences for conveying a first type of uplink payload in a resource block that is orthogonal to a second type of uplink payload transmitted from a second UE in the resource block, construct the codebook of sequences for the first type of uplink payload according to the codebook construction configuration, generate the first type of uplink payload for transmission using a first sequence from the codebook of sequences, and transmit the first type of uplink payload in the resource block, where the first type of uplink payload is multiplexed in the resource block with the second type of uplink payload from the second UE.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting sequence based uplink control channel coexistence).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
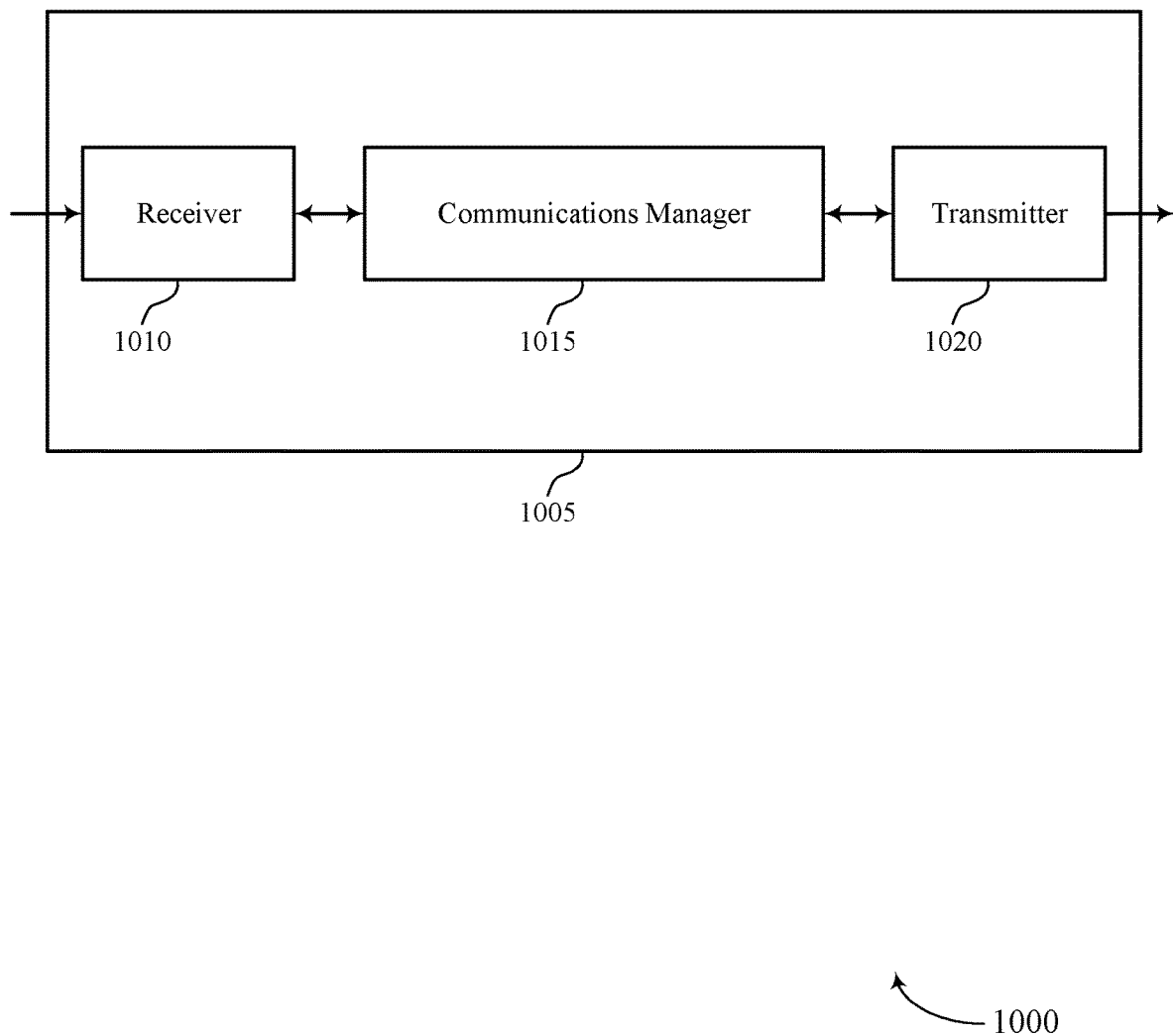
FIGS. 10 and 11 show diagrams of devices that support sequence based uplink control channel coexistence in accordance with aspects of the present disclosure.

FIG. 10 shows a diagram 1000 of a device 1005 that supports sequence based uplink control channel coexistence in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to sequence based uplink control channel coexistence, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a first UE, a configuration signal indicating a codebook construction configuration for the first UE to use for constructing a codebook of sequences for conveying a first type of uplink payload in a resource block that is orthogonal to a second type of uplink payload transmitted from a second UE, receive, the first type of uplink payload in the resource block from the first UE and the second type of uplink payload in the resource block from the second UE, demultiplex the first type of uplink payload from the second type of uplink payload, construct the codebook of sequences for the first type of uplink payload according to the codebook construction configuration, and decode the first type of uplink payload based on the codebook of sequences. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
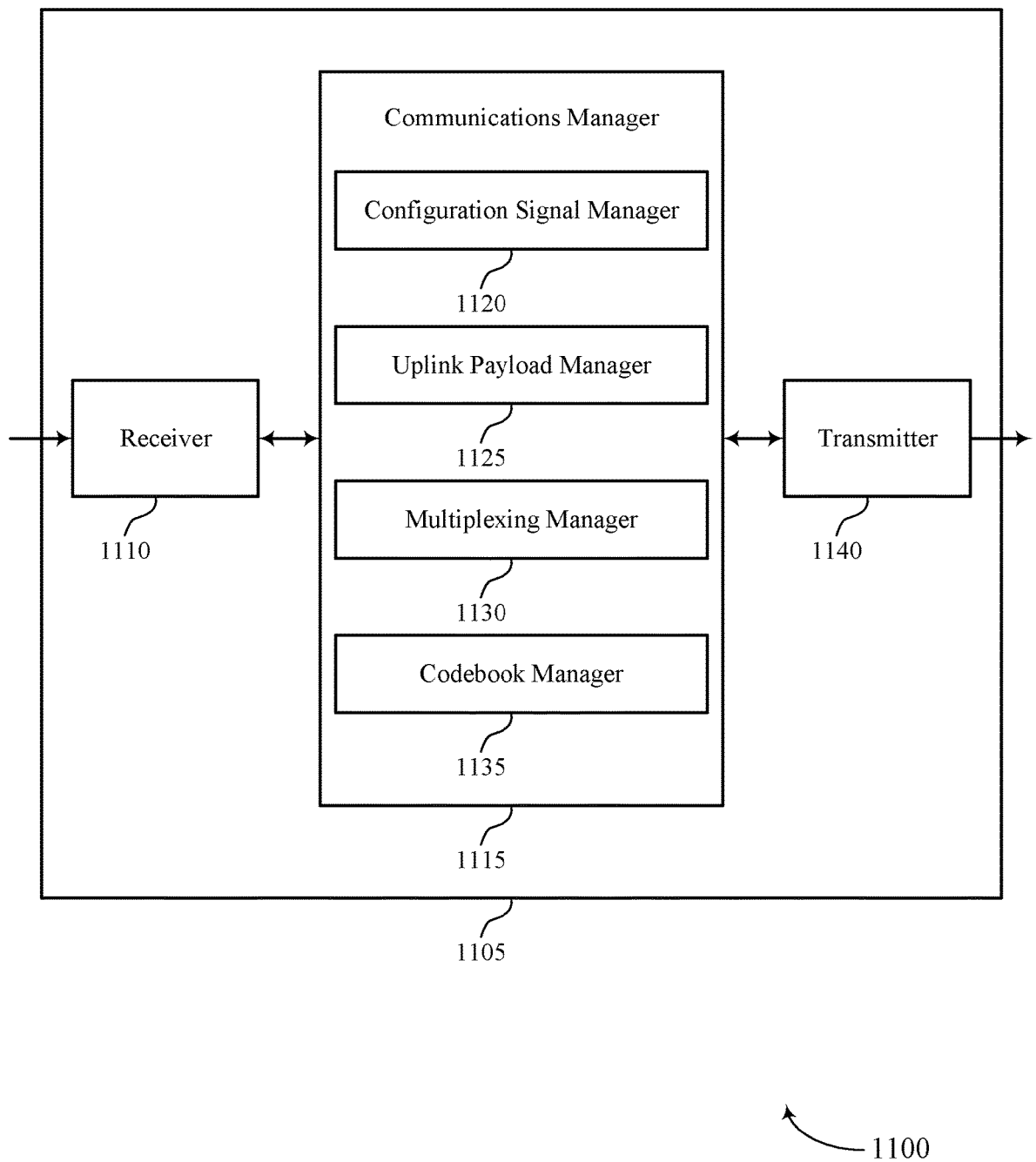

FIG. 11 shows a diagram 1100 of a device 1105 that supports sequence based uplink control channel coexistence in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to sequence based uplink control channel coexistence, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration signal manager 1120, an uplink payload manager 1125, a multiplexing manager 1130, and a codebook manager 1135. The communications manager 1115 may be an example of aspects of the communications manager 1310 described herein.

The configuration signal manager 1120 may transmit, to a first UE, a configuration signal indicating a codebook construction configuration for the first UE to use for constructing a codebook of sequences for conveying a first type of uplink payload in a resource block that is orthogonal to a second type of uplink payload transmitted from a second UE.

The uplink payload manager 1125 may receive, the first type of uplink payload in the resource block from the first UE and the second type of uplink payload in the resource block from the second UE.

The multiplexing manager 1130 may demultiplex the first type of uplink payload from the second type of uplink payload.

The codebook manager 1135 may construct the codebook of sequences for the first type of uplink payload according to the codebook construction configuration and decode the first type of uplink payload based on the codebook of sequences.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
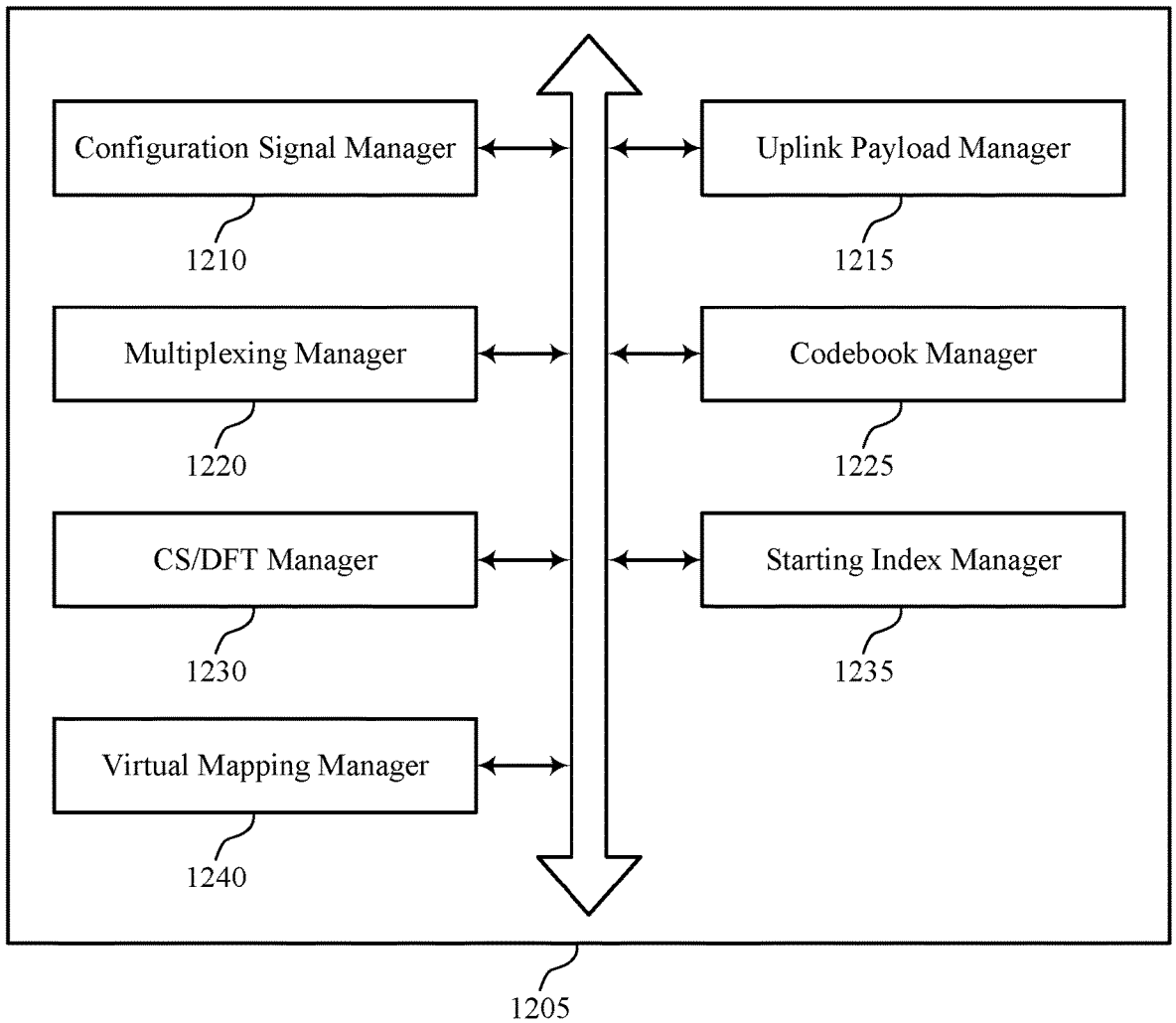
FIG. 12 shows a diagram of a communications manager that supports sequence based uplink control channel coexistence in accordance with aspects of the present disclosure.

FIG. 12 shows a diagram 1200 of a communications manager 1205 that supports sequence based uplink control channel coexistence in accordance with aspects of the present disclosure. The communications manager 1205 may be an example of aspects of a communications manager 1015, a communications manager 1115, or a communications manager 1310 described herein. The communications manager 1205 may include a configuration signal manager 1210, an uplink payload manager 1215, a multiplexing manager 1220, a codebook manager 1225, a CS/DFT manager 1230, a starting index manager 1235, and a virtual mapping manager 1240. Each of these modules may communicate, directly or indirectly, with one another (e.g., via one or more buses).

The configuration signal manager 1210 may transmit, to a first UE, a configuration signal indicating a codebook construction configuration for the first UE to use for constructing a codebook of sequences for conveying a first type of uplink payload in a resource block that is orthogonal to a second type of uplink payload transmitted from a second UE. In some examples, transmitting the configuration signal that includes at least one of a RRC signal, a MAC CE, a DCI, or a combination thereof. In some cases, the first type of uplink payload includes a PUCCH payload and the second type of uplink payload includes a legacy PUCCH payload.

The uplink payload manager 1215 may receive, the first type of uplink payload in the resource block from the first UE and the second type of uplink payload in the resource block from the second UE.

The multiplexing manager 1220 may demultiplex the first type of uplink payload from the second type of uplink payload.

The codebook manager 1225 may construct the codebook of sequences for the first type of uplink payload according to the codebook construction configuration. In some examples, the codebook manager 1225 may decode the first type of uplink payload based on the codebook of sequences.

The CS/DFT manager 1230 may transmit the configuration signal indicating the codebook construction configuration that indicates a set of cyclic shift indices, a set of DFT indices, or a combination, to use for constructing the codebook of sequences. In some examples, the CS/DFT manager 1230 may transmit the configuration signal indicating the codebook construction configuration that indicates a set of cyclic shift indices, a set of DFT indices, or a combination thereof, to avoid when constructing the codebook of sequences.

The starting index manager 1235 may transmit the configuration signal indicating the codebook construction configuration that indicates a starting index and quantity of indices for a set of cyclic shift indices, a set of DFT indices, or a combination thereof, to use for constructing the codebook of sequences. In some examples, the starting index manager 1235 may determine that at least one cyclic shift index of the set of cyclic shift indices, at least one DFT index of the set of DFT indices, or a combination thereof, used to construct the codebook of sequences is to be avoided.

In some examples, the starting index manager 1235 may replace the at least one cyclic shift index, the at least one DFT index, or combination thereof, with a virtual cyclic shift index, a virtual DFT index, or combination thereof, in the codebook of sequences. In some examples, the starting index manager 1235 may generate a virtual set of cyclic shift indices, a virtual set of DFT indices, or a combination thereof. In some examples, the starting index manager 1235 may construct the codebook of sequences based on the virtual set of cyclic shift indices, the virtual set of DFT indices, or the combination thereof. In some examples, the starting index manager 1235 may map, based on the configuration signal, the virtual set of cyclic shift indices, the virtual set of DFT indices, or combination thereof, to a real set of cyclic shift indices, a real set of DFT indices, or combinations thereof.

The virtual mapping manager 1240 may generate an orthogonal sequence pool by mapping resource elements associated with the orthogonal sequence pool in the physical domain to resource elements in a virtual domain. In some examples, the virtual mapping manager 1240 may construct a virtual codebook of sequences according to the mapping. In some examples, the virtual mapping manager 1240 may convert uplink payload data into an integer corresponding to a first sequence from the virtual codebook of sequences. In some examples, the virtual mapping manager 1240 may map the first sequence to a set of virtual resource elements in the virtual domain. In some examples, the virtual mapping manager 1240 may map the set of virtual resource elements in the virtual domain to a set of physical resource elements of the resource block in a physical domain for transmitting the first type of uplink payload in the resource block.

Figure 13:
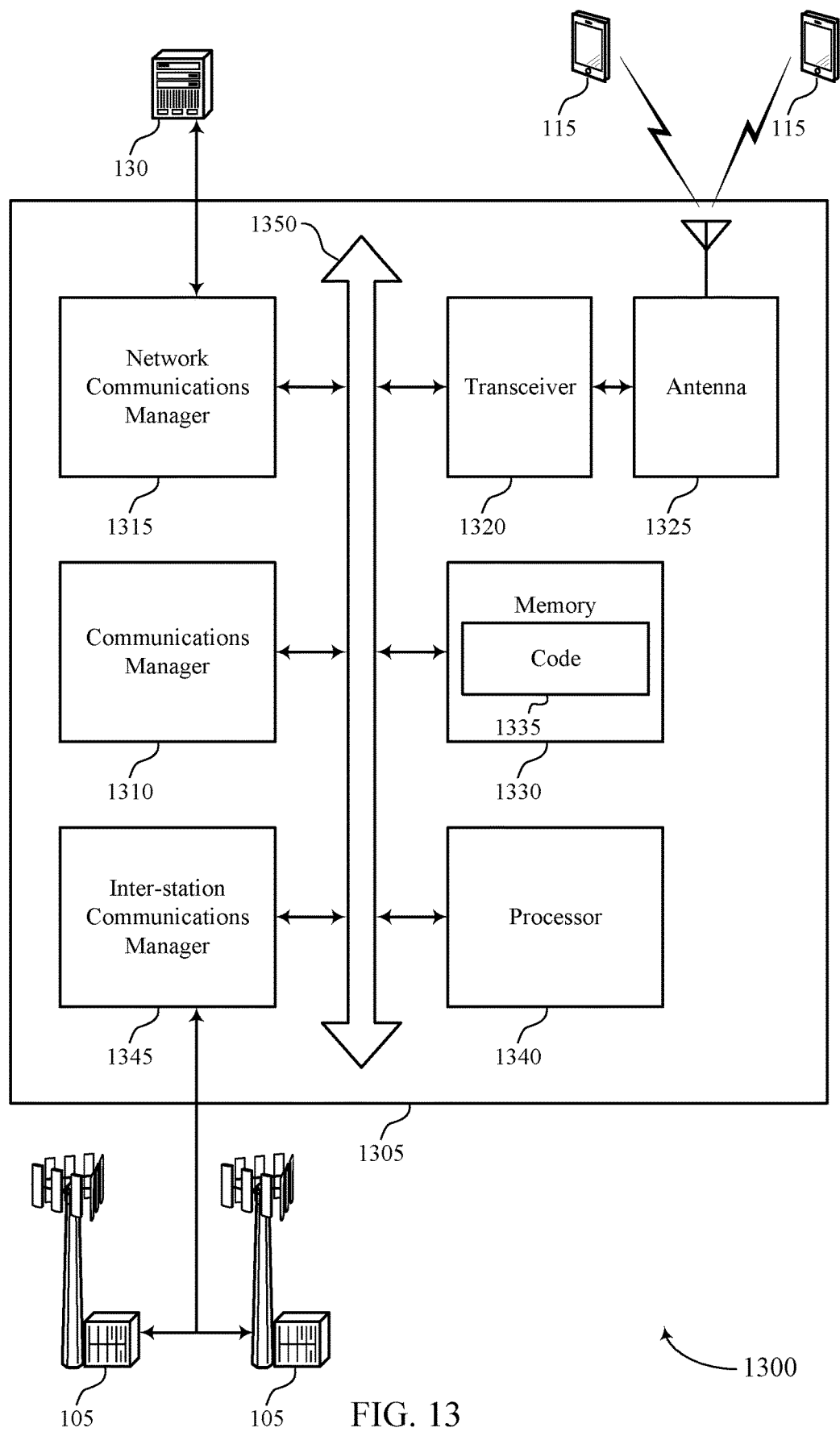
FIG. 13 shows a diagram of a system including a device that supports sequence based uplink control channel coexistence in accordance with aspects of the present disclosure.

FIG. 13 shows a diagram of a system 1300 including a device 1305 that supports sequence based uplink control channel coexistence in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a first UE, a configuration signal indicating a codebook construction configuration for the first UE to use for constructing a codebook of sequences for conveying a first type of uplink payload in a resource block that is orthogonal to a second type of uplink payload transmitted from a second UE, receive, the first type of uplink payload in the resource block from the first UE and the second type of uplink payload in the resource block from the second UE, demultiplex the first type of uplink payload from the second type of uplink payload, construct the codebook of sequences for the first type of uplink payload according to the codebook construction configuration, and decode the first type of uplink payload based on the codebook of sequences.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting sequence based uplink control channel coexistence).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
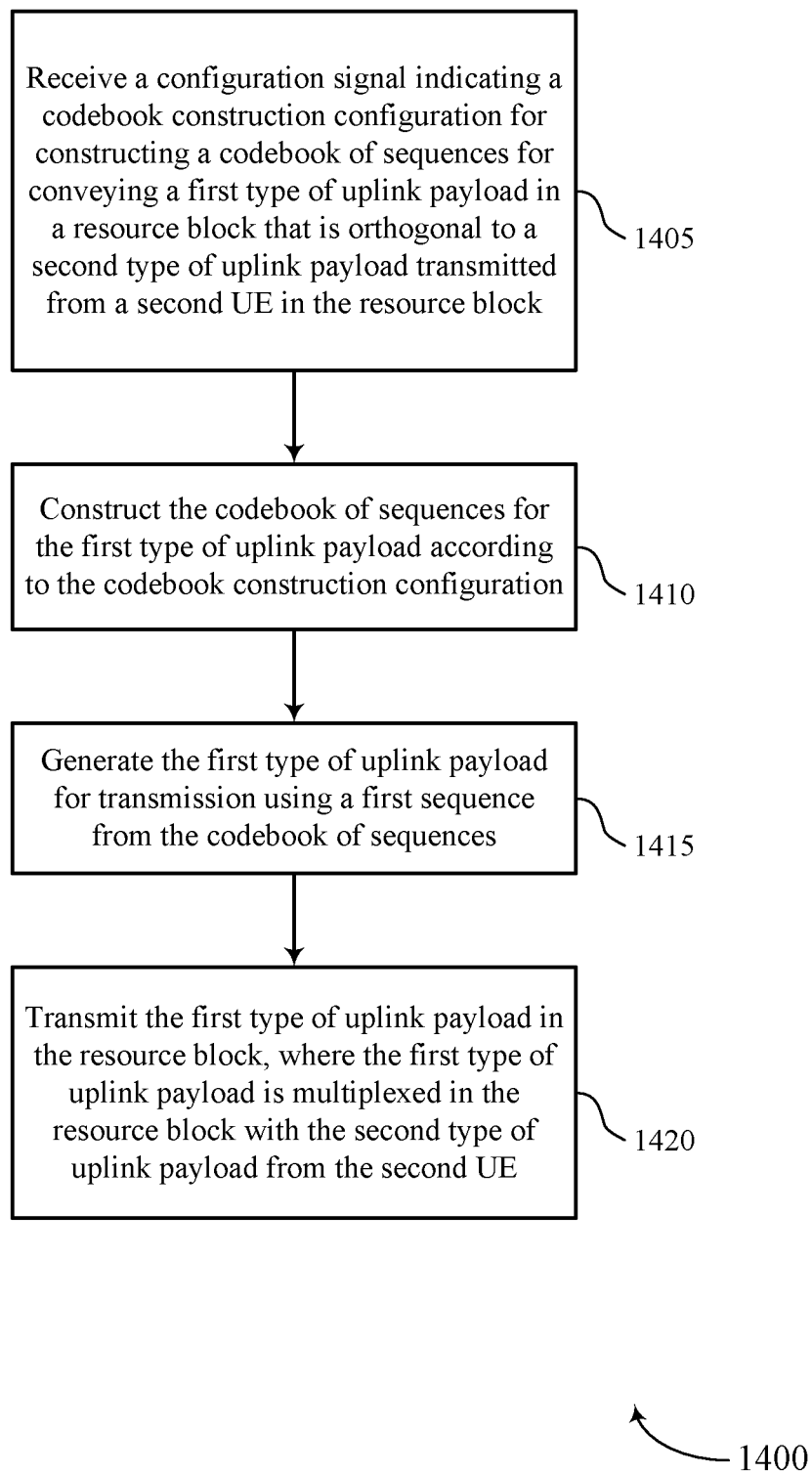
FIGS. 14 through 18 show flowcharts illustrating methods that support sequence based uplink control channel coexistence in accordance with aspects of the present disclosure.

FIG. 14 shows a flowchart illustrating a method 1400 that supports sequence based uplink control channel coexistence in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a configuration signal indicating a codebook construction configuration for constructing a codebook of sequences for conveying a first type of uplink payload in a resource block that is orthogonal to a second type of uplink payload transmitted from a second UE in the resource block. The operations of 1405 may be performed according to the methods described herein. In some examples, aspects of the operations of 1405 may be performed by a configuration signal manager as described with reference to FIGS. 6 through 9.

At 1410, the UE may construct the codebook of sequences for the first type of uplink payload according to the codebook construction configuration. The operations of 1410 may be performed according to the methods described herein. In some examples, aspects of the operations of 1410 may be performed by a codebook manager as described with reference to FIGS. 6 through 9.

At 1415, the UE may generate the first type of uplink payload for transmission using a first sequence from the codebook of sequences. The operations of 1415 may be performed according to the methods described herein. In some examples, aspects of the operations of 1415 may be performed by a codebook manager as described with reference to FIGS. 6 through 9.

At 1420, the UE may transmit the first type of uplink payload in the resource block, where the first type of uplink payload is multiplexed in the resource block with the second type of uplink payload from the second UE. The operations of 1420 may be performed according to the methods described herein. In some examples, aspects of the operations of 1420 may be performed by an uplink payload manager as described with reference to FIGS. 6 through 9.

Figure 15:
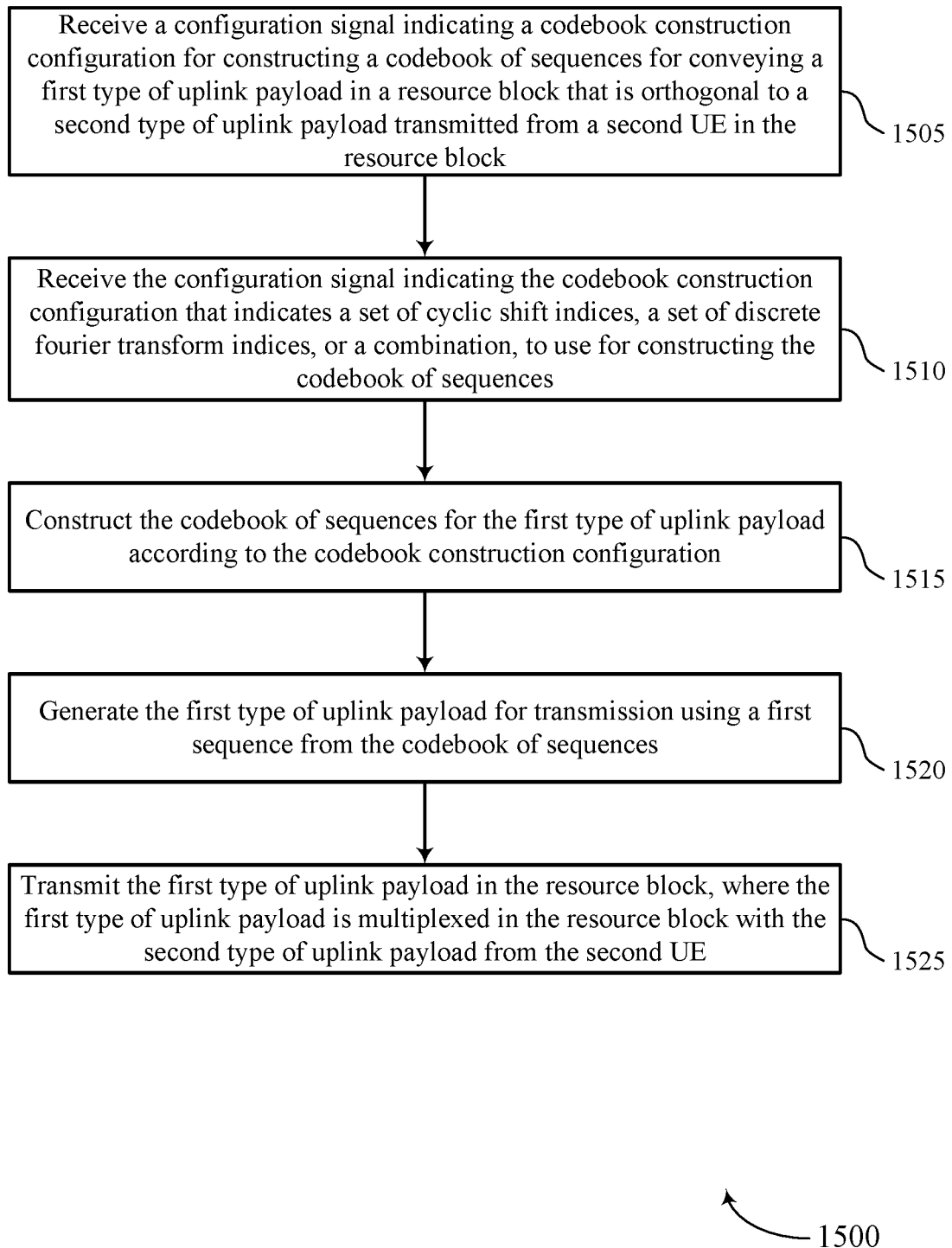

FIG. 15 shows a flowchart illustrating a method 1500 that supports sequence based uplink control channel coexistence in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a configuration signal indicating a codebook construction configuration for constructing a codebook of sequences for conveying a first type of uplink payload in a resource block that is orthogonal to a second type of uplink payload transmitted from a second UE in the resource block. The operations of 1505 may be performed according to the methods described herein. In some examples, aspects of the operations of 1505 may be performed by a configuration signal manager as described with reference to FIGS. 6 through 9.

At 1510, the UE may receive the configuration signal indicating the codebook construction configuration that indicates a set of cyclic shift indices, a set of DFT indices, or a combination, to use for constructing the codebook of sequences. The operations of 1510 may be performed according to the methods described herein. In some examples, aspects of the operations of 1510 may be performed by a CS/DFT manager as described with reference to FIGS. 6 through 9.

At 1515, the UE may construct the codebook of sequences for the first type of uplink payload according to the codebook construction configuration. The operations of 1515 may be performed according to the methods described herein. In some examples, aspects of the operations of 1515 may be performed by a codebook manager as described with reference to FIGS. 6 through 9.

At 1520, the UE may generate the first type of uplink payload for transmission using a first sequence from the codebook of sequences. The operations of 1520 may be performed according to the methods described herein. In some examples, aspects of the operations of 1520 may be performed by a codebook manager as described with reference to FIGS. 6 through 9.

At 1525, the UE may transmit the first type of uplink payload in the resource block, where the first type of uplink payload is multiplexed in the resource block with the second type of uplink payload from the second UE. The operations of 1525 may be performed according to the methods described herein. In some examples, aspects of the operations of 1525 may be performed by an uplink payload manager as described with reference to FIGS. 6 through 9.

Figure 16:
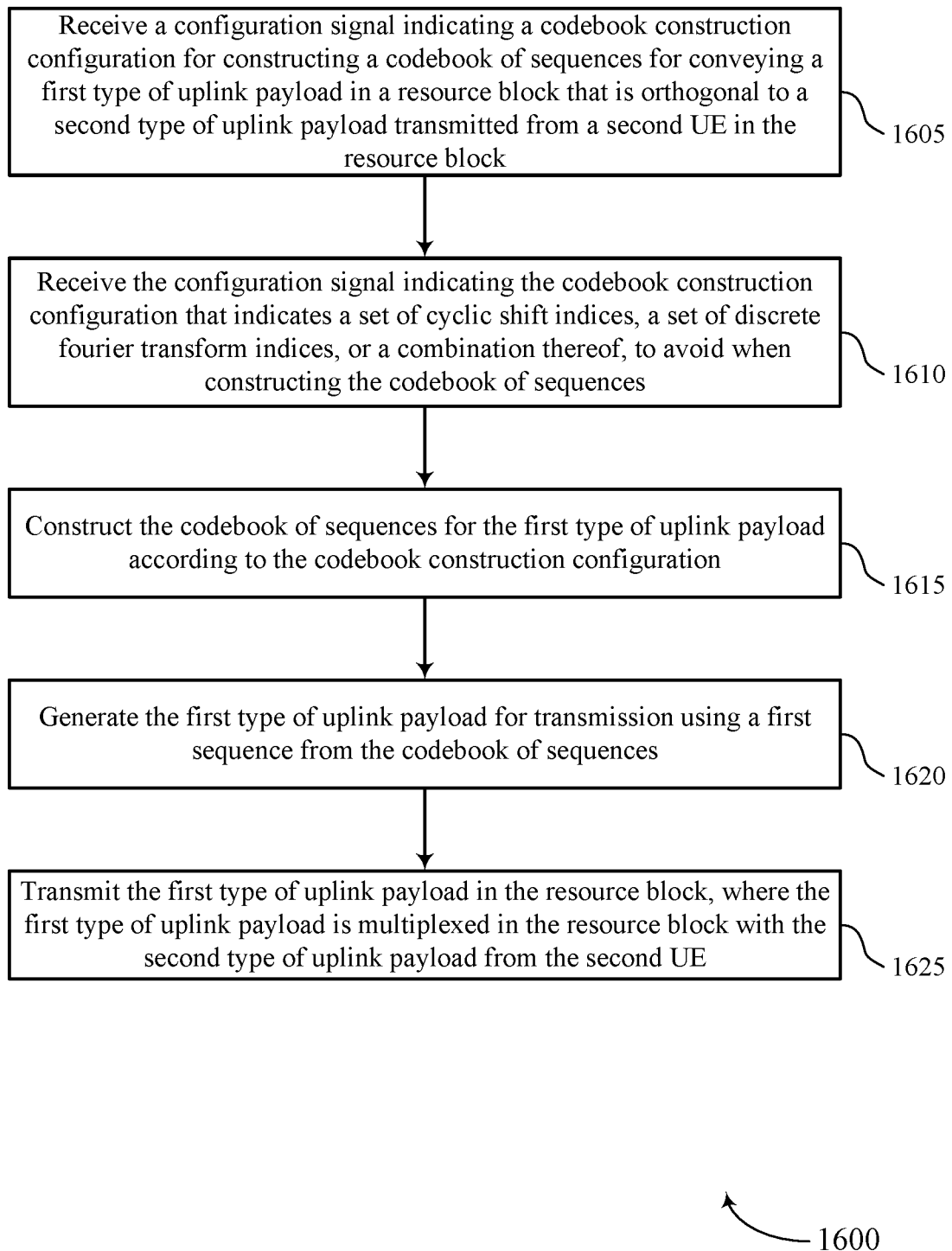

FIG. 16 shows a flowchart illustrating a method 1600 that supports sequence based uplink control channel coexistence in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a configuration signal indicating a codebook construction configuration for constructing a codebook of sequences for conveying a first type of uplink payload in a resource block that is orthogonal to a second type of uplink payload transmitted from a second UE in the resource block. The operations of 1605 may be performed according to the methods described herein. In some examples, aspects of the operations of 1605 may be performed by a configuration signal manager as described with reference to FIGS. 6 through 9.

At 1610, the UE may receive the configuration signal indicating the codebook construction configuration that indicates a set of cyclic shift indices, a set of DFT indices, or a combination thereof, to avoid when constructing the codebook of sequences. The operations of 1610 may be performed according to the methods described herein. In some examples, aspects of the operations of 1610 may be performed by a CS/DFT manager as described with reference to FIGS. 6 through 9.

At 1615, the UE may construct the codebook of sequences for the first type of uplink payload according to the codebook construction configuration. The operations of 1615 may be performed according to the methods described herein. In some examples, aspects of the operations of 1615 may be performed by a codebook manager as described with reference to FIGS. 6 through 9.

At 1620, the UE may generate the first type of uplink payload for transmission using a first sequence from the codebook of sequences. The operations of 1620 may be performed according to the methods described herein. In some examples, aspects of the operations of 1620 may be performed by a codebook manager as described with reference to FIGS. 6 through 9.

At 1625, the UE may transmit the first type of uplink payload in the resource block, where the first type of uplink payload is multiplexed in the resource block with the second type of uplink payload from the second UE. The operations of 1625 may be performed according to the methods described herein. In some examples, aspects of the operations of 1625 may be performed by an uplink payload manager as described with reference to FIGS. 6 through 9.

Figure 17:
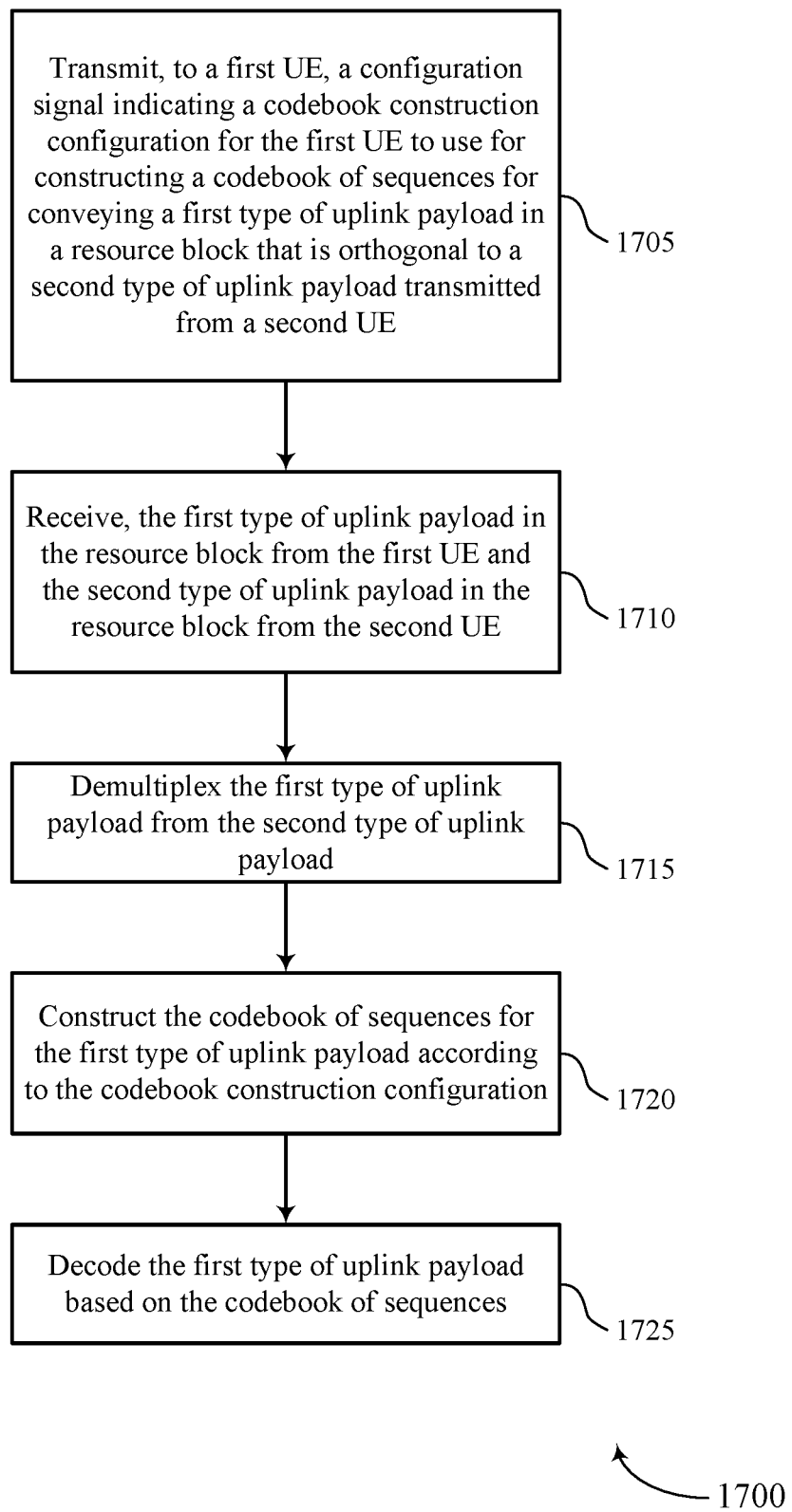

FIG. 17 shows a flowchart illustrating a method 1700 that supports sequence based uplink control channel coexistence in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a first UE, a configuration signal indicating a codebook construction configuration for the first UE to use for constructing a codebook of sequences for conveying a first type of uplink payload in a resource block that is orthogonal to a second type of uplink payload transmitted from a second UE. The operations of 1705 may be performed according to the methods described herein. In some examples, aspects of the operations of 1705 may be performed by a configuration signal manager as described with reference to FIGS. 10 through 13.

At 1710, the base station may receive, the first type of uplink payload in the resource block from the first UE and the second type of uplink payload in the resource block from the second UE. The operations of 1710 may be performed according to the methods described herein. In some examples, aspects of the operations of 1710 may be performed by an uplink payload manager as described with reference to FIGS. 10 through 13.

At 1715, the base station may demultiplex the first type of uplink payload from the second type of uplink payload. The operations of 1715 may be performed according to the methods described herein. In some examples, aspects of the operations of 1715 may be performed by a multiplexing manager as described with reference to FIGS. 10 through 13.

At 1720, the base station may construct the codebook of sequences for the first type of uplink payload according to the codebook construction configuration. The operations of 1720 may be performed according to the methods described herein. In some examples, aspects of the operations of 1720 may be performed by a codebook manager as described with reference to FIGS. 10 through 13.

At 1725, the base station may decode the first type of uplink payload based on the codebook of sequences. The operations of 1725 may be performed according to the methods described herein. In some examples, aspects of the operations of 1725 may be performed by a codebook manager as described with reference to FIGS. 10 through 13.

Figure 18:
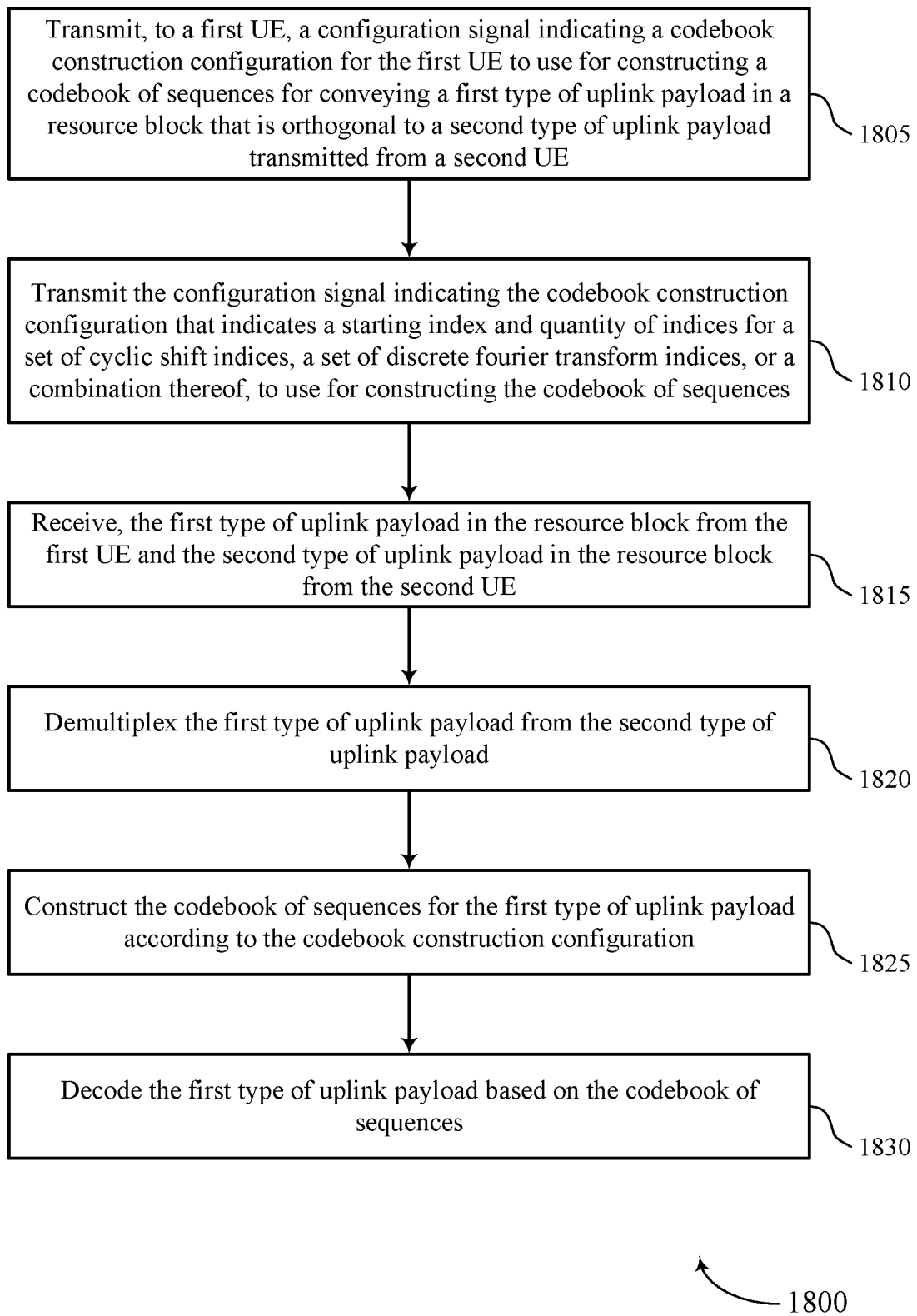

FIG. 18 shows a flowchart illustrating a method 1800 that supports sequence based uplink control channel coexistence in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a first UE, a configuration signal indicating a codebook construction configuration for the first UE to use for constructing a codebook of sequences for conveying a first type of uplink payload in a resource block that is orthogonal to a second type of uplink payload transmitted from a second UE. The operations of 1805 may be performed according to the methods described herein. In some examples, aspects of the operations of 1805 may be performed by a configuration signal manager as described with reference to FIGS. 10 through 13.

At 1810, the base station may transmit the configuration signal indicating the codebook construction configuration that indicates a starting index and quantity of indices for a set of cyclic shift indices, a set of DFT indices, or a combination thereof, to use for constructing the codebook of sequences. The operations of 1810 may be performed according to the methods described herein. In some examples, aspects of the operations of 1810 may be performed by a starting index manager as described with reference to FIGS. 10 through 13.

At 1815, the base station may receive, the first type of uplink payload in the resource block from the first UE and the second type of uplink payload in the resource block from the second UE. The operations of 1815 may be performed according to the methods described herein. In some examples, aspects of the operations of 1815 may be performed by an uplink payload manager as described with reference to FIGS. 10 through 13.

At 1820, the base station may demultiplex the first type of uplink payload from the second type of uplink payload. The operations of 1820 may be performed according to the methods described herein. In some examples, aspects of the operations of 1820 may be performed by a multiplexing manager as described with reference to FIGS. 10 through 13.

At 1825, the base station may construct the codebook of sequences for the first type of uplink payload according to the codebook construction configuration. The operations of 1825 may be performed according to the methods described herein. In some examples, aspects of the operations of 1825 may be performed by a codebook manager as described with reference to FIGS. 10 through 13.

At 1830, the base station may decode the first type of uplink payload based on the codebook of sequences. The operations of 1830 may be performed according to the methods described herein. In some examples, aspects of the operations of 1830 may be performed by a codebook manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first UE, comprising: receiving a configuration signal indicating a codebook construction configuration for constructing a codebook of sequences for conveying a first type of uplink payload in a resource block that is orthogonal to a second type of uplink payload transmitted from a second UE in the resource block; constructing the codebook of sequences for the first type of uplink payload according to the codebook construction configuration; generating the first type of uplink payload for transmission using a first sequence from the codebook of sequences; and transmitting the first type of uplink payload in the resource block, wherein the first type of uplink payload is multiplexed in the resource block with the second type of uplink payload from the second UE.

Aspect 2: The method of aspect 1, wherein receiving the configuration signal comprises: receiving the configuration signal indicating the codebook construction configuration that indicates a set of cyclic shift indices, a set of DFT indices, or a combination, to use for constructing the codebook of sequences.

Aspect 3: The method of any of aspects 1 through 2, wherein receiving the configuration signal comprises: receiving the configuration signal indicating the codebook construction configuration that indicates a set of cyclic shift indices, a set of DFT indices, or a combination thereof, to avoid when constructing the codebook of sequences.

Aspect 4: The method of any of aspects 1 through 3, wherein receiving the configuration signal comprises: receiving the configuration signal indicating the codebook construction configuration that indicates a starting index and quantity of indices for a set of cyclic shift indices, a set of DFT indices, or a combination thereof, to use for constructing the codebook of sequences.

Aspect 5: The method of aspect 4, further comprising: determining that at least one cyclic shift index of the set of cyclic shift indices, at least one DFT index of the set of DFT indices, or a combination thereof, used to construct the codebook of sequences is to be avoided; and replacing the at least one cyclic shift index, the at least one DFT index, or combination thereof, with a virtual cyclic shift index, a virtual DFT index, or combination thereof, in the codebook of sequences.

Aspect 6: The method of any of aspects 4 through 5, further comprising: generating a virtual set of cyclic shift indices, a virtual set of DFT indices, or a combination thereof, constructing the codebook of sequences based at least in part on the virtual set of cyclic shift indices, the virtual set of DFT indices, or the combination thereof; and mapping, based at least in part on the configuration signal, the virtual set of cyclic shift indices, the virtual set of DFT indices, or combination thereof, to a real set of cyclic shift indices, a real set of DFT indices, or combinations thereof.

Aspect 7: The method of any of aspects 1 through 6, wherein constructing the codebook of sequences according to the codebook construction configuration comprises: generating an orthogonal sequence pool by mapping resource elements associated with the orthogonal sequence pool in the physical domain to resource elements in a virtual domain; constructing a virtual codebook of sequences according to the mapping; converting uplink payload data into an integer corresponding to a first sequence from the virtual codebook of sequences; mapping the first sequence to a plurality of virtual resource elements in the virtual domain; and mapping the plurality of virtual resource elements in the virtual domain to a plurality of physical resource elements of the resource block in a physical domain for transmitting the first type of uplink payload in the resource block.

Aspect 8: The method of any of aspects 1 through 7, wherein receiving the configuration signal comprises: receiving the configuration signal that comprises at least one of an RRC signal, a MAC CE, a DCI, or a combination thereof.

Aspect 9: The method of any of aspects 1 through 8, wherein the first type of uplink payload comprises a PUCCH payload and the second type of uplink payload comprises a legacy PUCCH payload.

Aspect 10: A method for wireless communication at a base station, comprising: transmitting, to a first UE, a configuration signal indicating a codebook construction configuration for the first UE to use for constructing a codebook of sequences for conveying a first type of uplink payload in a resource block that is orthogonal to a second type of uplink payload transmitted from a second UE; receiving, the first type of uplink payload in the resource block from the first UE and the second type of uplink payload in the resource block from the second UE; demultiplexing the first type of uplink payload from the second type of uplink payload; constructing the codebook of sequences for the first type of uplink payload according to the codebook construction configuration; and decoding the first type of uplink payload based at least in part on the codebook of sequences.

Aspect 11: The method of aspect 10, wherein transmitting the configuration signal comprises: transmitting the configuration signal indicating the codebook construction configuration that indicates a set of cyclic shift indices, a set of DFT indices, or a combination, to use for constructing the codebook of sequences.

Aspect 12: The method of any of aspects 10 through 11, wherein transmitting the configuration signal comprises: transmitting the configuration signal indicating the codebook construction configuration that indicates a set of cyclic shift indices, a set of DFT indices, or a combination thereof, to avoid when constructing the codebook of sequences.

Aspect 13: The method of any of aspects 10 through 12, wherein transmitting the configuration signal comprises: transmitting the configuration signal indicating the codebook construction configuration that indicates a starting index and quantity of indices for a set of cyclic shift indices, a set of DFT indices, or a combination thereof, to use for constructing the codebook of sequences.

Aspect 14: The method of aspect 13, wherein constructing the codebook of sequences comprise determining that at least one cyclic shift index of the set of cyclic shift indices, at least one DFT index of the set of DFT indices, or a combination thereof, used to construct the codebook of sequences is to be avoided; and replacing the at least one cyclic shift index, the at least one DFT index, or combination thereof, with a virtual cyclic shift index, a virtual DFT index, or combination thereof, in the codebook of sequences.

Aspect 15: The method of any of aspects 13 through 14, wherein constructing the codebook of sequences comprises: generating a virtual set of cyclic shift indices, a virtual set of DFT indices, or a combination thereof; constructing the codebook of sequences based at least in part on the virtual set of cyclic shift indices, the virtual set of DFT indices, or the combination thereof, and mapping, based at least in part on the configuration signal, the virtual set of cyclic shift indices, the virtual set of DFT indices, or combination thereof, to a real set of cyclic shift indices, a real set of DFT indices, or combinations thereof.

Aspect 16: The method of any of aspects 10 through 15, wherein constructing the codebook of sequences according to the codebook construction configuration comprises: generating an orthogonal sequence pool by mapping resource elements associated with the orthogonal sequence pool in the physical domain to resource elements in a virtual domain; constructing a virtual codebook of sequences according to the mapping; converting uplink payload data into an integer corresponding to a first sequence from the virtual codebook of sequences; mapping the first sequence to a plurality of virtual resource elements in the virtual domain; and mapping the plurality of virtual resource elements in the virtual domain to a plurality of physical resource elements of the resource block in a physical domain for transmitting the first type of uplink payload in the resource block.

Aspect 17: The method of any of aspects 10 through 16, wherein transmitting the configuration signal comprises: transmitting the configuration signal that comprises at least one of an RRC signal, a MAC CE, a DCI, or a combination thereof.

Aspect 18: The method of any of aspects 10 through 17, wherein the first type of uplink payload comprises a PUCCH payload and the second type of uplink payload comprises a legacy PUCCH payload.

Aspect 19: An apparatus for wireless communication at a first UE, comprising a processor; memory coupled with the processor; and instructions stored in the memory and executable by the processor to cause the apparatus to perform a method of any of aspects 1 through 9.

Aspect 20: An apparatus for wireless communication at a first UE, comprising at least one means for performing a method of any of aspects 1 through 9.

Aspect 21: A non-transitory computer-readable medium storing code for wireless communication at a first UE, the code comprising instructions executable by a processor to perform a method of any of aspects 1 through 9.

Aspect 22: An apparatus for wireless communication at a base station, comprising a processor; memory coupled with the processor; and instructions stored in the memory and executable by the processor to cause the apparatus to perform a method of any of aspects 10 through 18.

Aspect 23: An apparatus for wireless communication at a base station, comprising at least one means for performing a method of any of aspects 10 through 18.

Aspect 24: A non-transitory computer-readable medium storing code for wireless communication at a base station, the code comprising instructions executable by a processor to perform a method of any of aspects 10 through 18.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
   receiving a configuration signal indicating a codebook construction configuration for constructing a codebook of sequences for conveying a first type of uplink payload in a resource block that is orthogonal to a second type of uplink payload transmitted from a second UE in the resource block;
   constructing the codebook of sequences for the first type of uplink payload according to the codebook construction configuration;
   generating the first type of uplink payload for transmission using a first sequence from the codebook of sequences; and
   transmitting the first type of uplink payload in the resource block, wherein the first type of uplink payload is multiplexed in the resource block with the second type of uplink payload from the second UE,
   wherein said constructing the codebook of sequences according to the codebook construction configuration comprises:
   generating an orthogonal sequence pool by mapping resource elements associated with the orthogonal sequence pool in the physical domain to resource elements in a virtual domain;
   constructing a virtual codebook of sequences according to the mapping;
   converting uplink payload data into an integer corresponding to a first sequence from the virtual codebook of sequences;
   mapping the first sequence to a plurality of virtual resource elements in the virtual domain; and
   mapping the plurality of virtual resource elements in the virtual domain to a plurality of physical resource elements of the resource block in a physical domain for transmitting the first type of uplink payload in the resource block.

2. The method of claim 1, wherein receiving the configuration signal comprises:
   receiving the configuration signal indicating the codebook construction configuration that indicates a set of cyclic shift indices, a set of discrete Fourier transform indices, or a combination, to use for constructing the codebook of sequences.

3. The method of claim 1, wherein receiving the configuration signal comprises:
   receiving the configuration signal indicating the codebook construction configuration that indicates a set of cyclic shift indices, a set of discrete Fourier transform indices, or a combination thereof, to avoid when constructing the codebook of sequences.

4. The method of claim 1, wherein receiving the configuration signal comprises:
   receiving the configuration signal indicating the codebook construction configuration that indicates a starting index and quantity of indices for a set of cyclic shift indices, a set of discrete Fourier transform indices, or a combination thereof, to use for constructing the codebook of sequences.

5. The method of claim 4, further comprising:
determining that at least one cyclic shift index of the set of cyclic shift indices, at least one discrete Fourier transform index of the set of discrete Fourier transform indices, or a combination thereof, used to construct the codebook of sequences is to be avoided; and
replacing the at least one cyclic shift index, the at least one discrete Fourier transform index, or combination thereof, with a virtual cyclic shift index, a virtual discrete Fourier transform index, or combination thereof, in the codebook of sequences.

6. The method of claim 4, further comprising:
generating a virtual set of cyclic shift indices, a virtual set of discrete Fourier transform indices, or a combination thereof,
constructing the codebook of sequences based at least in part on the virtual set of cyclic shift indices, the virtual set of discrete Fourier transform indices, or the combination thereof; and
mapping, based at least in part on the configuration signal, the virtual set of cyclic shift indices, the virtual set of discrete Fourier transform indices, or combination thereof, to a real set of cyclic shift indices, a real set of discrete Fourier transform indices, or combinations thereof.

7. The method of claim 1, wherein receiving the configuration signal comprises:
receiving the configuration signal that comprises at least one of a radio resource control (RRC) signal, a medium access control (MAC) control element (CE), a downlink control information (DCI), or a combination thereof.

8. The method of claim 1, wherein the first type of uplink payload comprises a physical uplink control channel (PUCCH) payload and the second type of uplink payload comprises a legacy PUCCH payload.

9. A method for wireless communication at a base station, comprising:
transmitting, to a first user equipment (UE), a configuration signal indicating a codebook construction configuration for the first UE to use for constructing a codebook of sequences for conveying a first type of uplink payload in a resource block that is orthogonal to a second type of uplink payload transmitted from a second LTE:
receiving, the first type of uplink payload in the resource block from the first UE and the second type of uplink payload in the resource block from the second UE;
demultiplexing the first type of uplink payload from the second type of uplink payload;
constructing the codebook of sequences for the first type of uplink payload according to the codebook construction configuration; and
decoding the first type of uplink payload based at least in part on the codebook of sequences,
wherein said constructing the codebook of sequences according to the codebook construction configuration comprises:
generating an orthogonal sequence pool by mapping resource elements associated with the orthogonal sequence pool in the physical domain to resource elements in a virtual domain;
constructing a virtual codebook of sequences according to the mapping;
converting uplink payload data into an integer corresponding to a first sequence from the virtual codebook of sequences;
mapping the first sequence to a plurality of virtual resource elements in the virtual domain; and
mapping the plurality of virtual resource elements in the virtual domain to a plurality of physical resource elements of the resource block in a physical domain for transmitting the first type of uplink payload in the resource block.

10. The method of claim 9, wherein transmitting the configuration signal comprises:
transmitting the configuration signal indicating the codebook construction configuration that indicates a set of cyclic shift indices, a set of discrete Fourier transform indices, or a combination, to use for constructing the codebook of sequences.

11. The method of claim 9, wherein transmitting the configuration signal comprises:
transmitting the configuration signal indicating the codebook construction configuration that indicates a set of cyclic shift indices, a set of discrete Fourier transform indices, or a combination thereof, to avoid when constructing the codebook of sequences.

12. The method of claim 9, wherein transmitting the configuration signal comprises:
transmitting the configuration signal indicating the codebook construction configuration that indicates a starting index and quantity of indices for a set of cyclic shift indices, a set of discrete Fourier transform indices, or a combination thereof, to use for constructing the codebook of sequences.

13. The method of claim 12, wherein constructing the codebook of sequences comprise:
determining that at least one cyclic shift index of the set of cyclic shift indices, at least one discrete Fourier transform index of the set of discrete Fourier transform indices, or a combination thereof, used to construct the codebook of sequences is to be avoided; and
replacing the at least one cyclic shift index, the at least one discrete Fourier transform index, or combination thereof, with a virtual cyclic shift index, a virtual discrete Fourier transform index, or combination thereof, in the codebook of sequences.

14. The method of claim 12, wherein constructing the codebook of sequences comprises:
generating a virtual set of cyclic shift indices, a virtual set of discrete Fourier transform indices, or a combination thereof;
constructing the codebook of sequences based at least in part on the virtual set of cyclic shift indices, the virtual set of discrete Fourier transform indices, or the combination thereof; and
mapping, based at least in part on the configuration signal, the virtual set of cyclic shift indices, the virtual set of discrete Fourier transform indices, or combination thereof; to a real set of cyclic shift indices, a real set of discrete Fourier transform indices, or combinations thereof.

15. The method of claim 9, wherein transmitting the configuration signal comprises:
transmitting the configuration signal that comprises at least one of a radio resource control (RRC) signal, a medium access control (MAC) control element (CE), a downlink control information (DCI), or a combination thereof.

16. The method of claim 9, wherein the first type of uplink payload comprises a physical uplink control channel (PUCCH) payload and the second type of uplink payload comprises a legacy PUCCH payload.

17. An apparatus for wireless communication at a first user equipment (UE), comprising:
a processor, and
memory, coupled with the processor, including
instructions executable by the processor to cause the apparatus to:
receive a configuration signal indicating a codebook construction configuration for constructing a codebook of sequences for conveying a first type of uplink payload in a resource block that is orthogonal to a second type of uplink payload transmitted from a second UE in the resource block;
construct the codebook of sequences for the first type of uplink payload according to the codebook construction configuration;
generate the first type of uplink payload for transmission using a first sequence from the codebook of sequences; and
transmit the first type of uplink payload in the resource block, wherein the first type of uplink payload is multiplexed in the resource block with the second type of uplink payload from the second UE,
wherein the instructions executable by the processor to cause the apparatus to construct the codebook of sequences according to the codebook construction configuration comprise instructions executable by the processor to cause the apparatus to:
generate an orthogonal sequence pool by mapping resource elements associated with the orthogonal sequence pool in the physical domain to resource elements in a virtual domain;
construct a virtual codebook of sequences according to the mapping;
convert uplink payload data into an integer corresponding to a first sequence from the virtual codebook of sequences:
map the first sequence to a plurality of virtual resource elements in the virtual domain; and
map the plurality of virtual resource elements in the virtual domain to a plurality of physical resource elements of the resource block in a physical domain for transmitting the first type of uplink payload in the resource block.

18. The apparatus of claim 17, wherein the instructions executable by the processor to cause the apparatus to receive the configuration signal comprise instructions executable by the processor to cause the apparatus to:
receive the configuration signal indicating the codebook construction configuration that indicates a set, of cyclic shift indices, a set of discrete Fourier transform indices, or a combination, to use for constructing the codebook of sequences.

19. The apparatus of claim 17, wherein the instructions executable by the processor to cause the apparatus to receive the configuration signal comprise instructions executable by the processor to cause the apparatus to:
receive the configuration signal indicating the codebook construction configuration that indicates a set of cyclic shift indices, a set of discrete Fourier transform indices, or a combination thereof, to avoid when constructing the codebook of sequences.

20. The apparatus of claim 17, wherein the instructions executable by the processor to cause the apparatus to receive the configuration signal comprise instructions executable by the processor to cause the apparatus to:
receive the configuration signal indicating the codebook construction configuration that indicates a starting index and quantity of indices for a set of cyclic shift indices, a set of discrete Fourier transform indices, or a combination thereof, to use for constructing the codebook of sequences.

21. The apparatus of claim 20, wherein the instructions are further executable by the processor to cause the apparatus to:
determine that at least one cyclic shift index of the set of cyclic shift indices, at least one discrete Fourier transform index of the set of discrete Fourier transform indices, or a combination thereof, used to construct the codebook of sequences is to be avoided; and
replace the at least one cyclic shift index, the at least one discrete Fourier transform index, or combination thereof, with a virtual cyclic shift index, a virtual discrete Fourier transform index, or combination thereof, in the codebook of sequences.

22. The apparatus of claim 20, wherein the instructions are further executable by the processor to cause the apparatus to:
generate a virtual set of cyclic shift indices, a virtual set of discrete Fourier transform indices, or a combination thereof;
construct the codebook of sequences based at least in part on the virtual set of cyclic shift indices, the virtual set of discrete Fourier transform indices, or the combination thereof, and
map, based at least in part on the configuration signal the virtual set of cyclic shift indices, the virtual set of discrete Fourier transform indices, or combination thereof, to a real set of cyclic shift indices, a real set of discrete Fourier transform indices, or combinations thereof.

23. The apparatus of claim 17, wherein the instructions executable by the processor to cause the apparatus to receive the configuration signal comprise instructions executable by the processor to cause the apparatus to:
receive the configuration signal that comprises at least one of a radio resource control (RRC) signal, a medium access control (MAC) control element (CE), a downlink control information (DCI) or a combination thereof.

24. The apparatus of claim 17, wherein the first type of uplink payload comprises a physical uplink control channel (PUCCH) payload and the second type of uplink payload comprises a legacy PUCCH payload.

25. An apparatus for wireless communication at a base station, comprising:
a processor, and
memory, coupled with the processor, including
instructions executable by the processor to cause the apparatus to:
transmit, to a first user equipment (UE), a configuration signal indicating a codebook construction configuration for the first UE to use for constructing a codebook of sequences for conveying a first type of uplink payload in a resource block that is orthogonal to a second type of uplink payload transmitted from a second UE;
receive, the first type of uplink payload in the resource block from the first UE and the second type of uplink payload in the resource block from the second UE;

demultiplex the first type of uplink payload from the second type of uplink payload;

construct the codebook of sequences for the first type of uplink payload according to the codebook construction configuration; and decode the first type of uplink payload based at least in part on the codebook of sequences, wherein the instructions executable by the processor to cause the apparatus to construct the codebook of sequences according to the codebook construction configuration comprise instructions executable by the processor to cause the apparatus to:

generate an orthogonal sequence pool by mapping resource elements associated with the orthogonal sequence pool in the physical domain to resource elements in a virtual domain;

construct a virtual codebook of sequences according to the mapping;

convert uplink payload data into an integer corresponding to a first sequence from the virtual codebook of sequences;

map the first sequence to a plurality of virtual resource elements in the virtual domain; and map the plurality of virtual resource elements in the virtual domain to a plurality of physical resource elements of the resource block in a physical domain for transmitting the first type of uplink payload in the resource block.

26. The apparatus of claim 25, wherein the instructions executable by the processor to cause the apparatus to transmit the configuration signal comprise instructions executable by the processor to cause the apparatus to:

transmit the configuration signal indicating the codebook construction configuration that indicates a set of cyclic shift indices, a set of discrete Fourier transform indices, or a combination, to use for constructing the codebook of sequences.

27. The apparatus of claim 25, wherein the instructions executable by the processor to cause the apparatus to transmit the configuration signal comprise instructions executable by the processor to cause the apparatus to:

transmit the configuration signal indicating the codebook construction configuration that indicates a set of cyclic shift indices, a set of discrete Fourier transform indices, or a combination thereof, to avoid when constructing the codebook of sequences.

* * * * *